(12) United States Patent
Xu et al.

(10) Patent No.: US 9,753,944 B2
(45) Date of Patent: Sep. 5, 2017

(54) SYSTEM AND METHOD FOR STREAMING FILES THROUGH DIFFERENTIAL COMPRESSION

(71) Applicant: Cormentis Design Corporation, Riverside, CA (US)

(72) Inventors: Bin Xu, Mountain View, CA (US); Yanggui Chen, San Jose, CA (US)

(73) Assignee: Cormentis Design Corporation, Riverside, CA (US)

( * ) Notice: Subject to any disclaimer, the term of this patent is extended or adjusted under 35 U.S.C. 154(b) by 352 days.

(21) Appl. No.: 14/334,480

(22) Filed: Jul. 17, 2014

(65) Prior Publication Data

US 2015/0186372 A1      Jul. 2, 2015

Related U.S. Application Data

(60) Provisional application No. 61/921,366, filed on Dec. 27, 2013.

(51) Int. Cl.
*G06F 17/30* (2006.01)
*H04L 29/08* (2006.01)

(52) U.S. Cl.
CPC .... *G06F 17/3023* (2013.01); *G06F 17/30153* (2013.01); *G06F 17/30174* (2013.01); *H04L 67/06* (2013.01); *H04L 67/10* (2013.01)

(58) Field of Classification Search
CPC ................ G06F 8/68; G06F 17/30088; G06F 17/30194; G06F 17/3023; G06F 17/30115; G06F 17/30162
See application file for complete search history.

(56) References Cited

U.S. PATENT DOCUMENTS

| 8,862,555 | B1* | 10/2014 | Xu | G06F 17/30162 707/687 |
| 8,997,082 | B1* | 3/2015 | Bacus | G06F 17/2288 717/169 |
| 2006/0112152 | A1* | 5/2006 | Napier | G06F 8/68 |
| 2007/0150809 | A1* | 6/2007 | Yoshida | G06F 17/2229 715/235 |
| 2007/0288533 | A1* | 12/2007 | Srivastava | G06F 17/30215 |
| 2008/0140980 | A1* | 6/2008 | Mei | G06F 13/1642 711/170 |
| 2010/0293147 | A1* | 11/2010 | Snow | G06F 17/30067 707/640 |

(Continued)

*Primary Examiner* — Michelle Owyang
(74) *Attorney, Agent, or Firm* — Raubvogel Law Office

(57) ABSTRACT

A computer system receives a plurality of files having respective file sizes. The computer system categorizes the files into different categories according to their respective file sizes. For a file in the first category, the computer system identifies first and second versions of the file and generates a difference between the two versions based on a view of the first version and a view of the second version. For files in the second category, the computer system identifies a file aggregation of the files by combining them into one file such that the combined file have a file size within the first file size range. The computer system identifies first and second versions of the file aggregation and generates a difference between the first and second versions based on a view of the first version and a view of the second version of the file aggregation.

18 Claims, 22 Drawing Sheets

(56) References Cited

U.S. PATENT DOCUMENTS

| | | | |
|---|---|---|---|
| 2011/0055155 A1* | 3/2011 | Page | G06F 8/68 707/625 |
| 2011/0072058 A1* | 3/2011 | Tang | G06F 9/5055 707/823 |
| 2011/0302583 A1* | 12/2011 | Abadi | G06F 17/30545 718/102 |
| 2012/0089579 A1* | 4/2012 | Ranade | G06F 17/30203 707/693 |
| 2012/0136832 A1* | 5/2012 | Sadhwani | G06F 11/1469 707/640 |
| 2013/0258375 A1* | 10/2013 | Morgana | G06K 15/1822 358/1.13 |

* cited by examiner

FIGURE 22A

Data Transport Platform: Update 2202 | Sync 2204 | Delta 2206 | Storage | Security | UDT Protocol | Utility 1 • • • Utility m

FIGURE 22B

Data Transport Platform: Update 2202 | Sync 2204 | Delta 2206 | Stream 2208 | Storage | Security | UDT Protocol | Utility 1 • • • Utility m

SYSTEM AND METHOD FOR STREAMING FILES THROUGH DIFFERENTIAL COMPRESSION

RELATED APPLICATIONS

This application claims the benefit of U.S. Provisional Patent Application No. 61/921,366, titled "System and Method for Transferring Files through Differential Compression," filed Dec. 27, 2013, which is incorporated by reference herein in its entirety.

FIELD OF THE INVENTION

The present application generally relates to network file transfer, in particular, to system and method for transferring files through differential compression.

BACKGROUND OF THE INVENTION

With the advent of big data, the problem of transferring massive amounts of data over the Internet has become even more challenging. Many organizations, e.g., global companies have urgent needs to move massive files from data center to data center or from headquarter to headquarter, or upload large volume of files to the cloud. Examples include file replication, disaster recovery, remote backup, file sharing and synchronizing, file distribution and publishing, and so on. Traditional file transfer technologies, such as File Transfer Protocol (FTP) and RSYNC, are facing challenges when carrying those tasks due to the overwhelming volume of data traffic across the network infrastructure.

SUMMARY

The above deficiencies and other problems associated with the conventional approach of file transfer are reduced or eliminated by the present application disclosed below. In some embodiments, the present application is implemented in a computer server that has one or more processors, memory and one or more modules, programs or sets of instructions stored in the memory for performing multiple functions and communicating with one or more client devices (e.g., a computer or a smartphone) that has one or more processors, memory and one or more modules, programs or sets of instructions stored in the memory for performing multiple functions. Instructions for performing these functions may be included in a computer program product configured for execution by one or more processors.

A first aspect of the present application involves a method of transferring a file set from a source to a destination using a computer system. The computer system identifies a first version of a file set of a plurality of files. The computer system identifies one or more file set changes from a second version of the file set to the first version of the file set. The file set changes include at least one of: one or more added files, one or more updated files, and one or more deleted files. A view of the first version is generated based on a view of the second version and the identified file set changes. A difference between the view of the first version and the view of the second version is generated based on the view of the file set changes. The difference is transferred to a destination having the second version. The destination is configured to generate the first version from the second version and the difference.

A second aspect of the present application involves a method of transferring a file set from a source to a destination using a computer system. The computer system identifies a first file set of a first plurality of files. The computer system generates a first view of the first file set and receives, from a destination, a second view of a second file set of a second plurality of files. The computer system generates a difference based on the first view, the second view, and the first file set and transfers the difference to the destination, which is configured to generate the first file set from the second file set and the difference.

A third aspect of the present application involves a method of transferring a file set from a source to a destination using a computer system. The computer system identifies a first file set of a first plurality of files and a second file set of a second plurality of files and generates a first view of the first file set and a second view of the second file set. After generating a difference based on the first view, the second view, and the first file set, the computer system transfers the difference to the destination. The destination is configured to generate the first file set from the second file set and the difference.

A fourth aspect of the present application involves a method of transferring a file set from a source to a destination using a computer system. The computer system receives a plurality of files, the files having respective file sizes. The computer system categorizes the plurality of files into a plurality of categories according to their respective file sizes. The plurality of categories includes: a first category of files having respective file sizes in a first file size range; and a second category of files having respective file sizes in a second file size range, wherein the file sizes in the second file size range are smaller than the file sizes in the first file size range. For a respective file in the first category of files, the computer system identifies a first version and a second version of the respective file and generates a difference between the first version and the second version of the respective file in the first category based on a view of the first version and a view of the second version, the first version being reconstructable from the second version and the difference. For a plurality of respective files in the second category of files, the computer system identifies a file aggregation of the plurality of respective files by combining the plurality of respective files into one file such that the combined file have a file size in the first file size range. The computer system identifies a first version and a second version of the file aggregation and generates a difference between the first version and the second version of the file aggregation based on a view of the first version and a view of the second version. The file aggregation comprises the plurality of respective files and the first version of the file aggregation is reconstructable from the second version of the file aggregation and the difference.

Various advantages of the present application are apparent in light of the descriptions below.

BRIEF DESCRIPTION OF THE DRAWINGS

FIGS. 22A-22B illustrate example data transport platforms in accordance with some embodiments.

Like reference numerals refer to corresponding parts throughout the drawings.

DESCRIPTION OF EMBODIMENTS

Reference will now be made in detail to embodiments, examples of which are illustrated in the embedded drawings. In the following detailed description, numerous specific details are set forth in order to provide a thorough understanding of the subject matter represented herein. But it will be apparent to one skilled in the art that the subject matter may be practiced without these specific details. In other instances, well-known methods, procedures, components, and circuits have not been described in detail so as not to unnecessarily obscure aspects of the embodiments.

Generally speaking, there are two approaches of designing an efficient file transferring technology: (i) transferring less yet equivalent data through, e.g., differential compression and (ii) employing a file transport acceleration protocol.

In this application, a new set of differential compression techniques is described. They generate "difference" between either two individual files or between two file sets. A new concept called "VIEW" that provides an efficient abstract of an individual file or a file set is introduced. This concept provides a framework for the differential compression techniques disclosed in the present application.

In some embodiments, there are many file transfer applications that may benefit from the differential compression techniques disclosed in the present application:

remote backup;
file replication;
disaster recovery;
file distribution and publishing;
file sharing, exchanging, synchronizing for collaboration;
managed file transfer;
big data cloud migration;
WAFS: wide area file service;
software release and patch management; and
mobile app download and upgrade.

Figure 1:
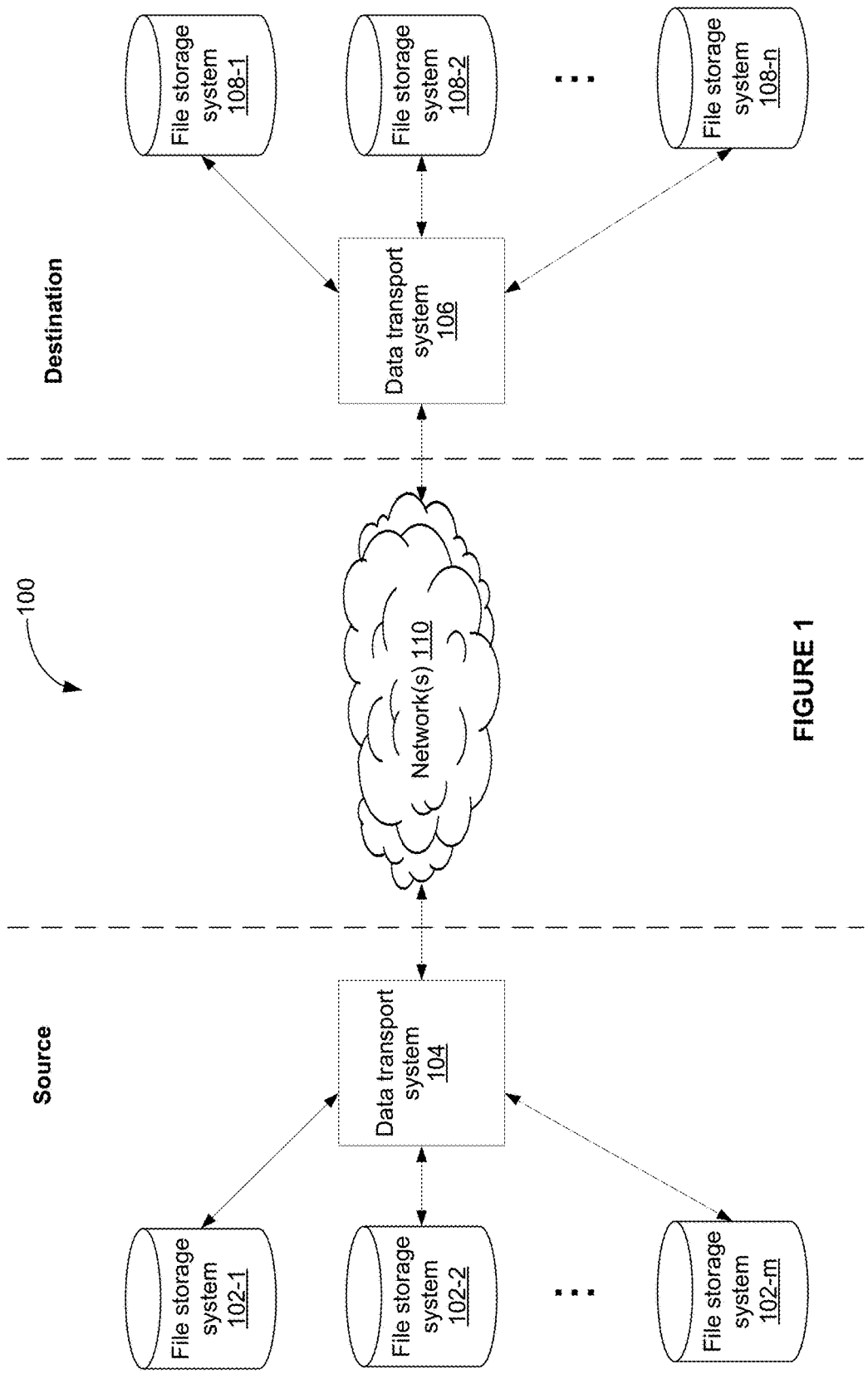
FIG. 1 is a block diagram illustrating a data transport network in accordance with some embodiments.

FIG. 1 illustrates a data transport network 100 in accordance with some embodiments. The data transport (or "data transfer") network 100 includes file storage systems 102 and 108, data transport systems 104 and 106, and communication network(s) 110.

The file storage system 102, at the source side, stores the files to be transported to the destination side for storage at the file storage system 108. The data transport system 104 performs various operations on the files to prepare the files for transport. In some embodiments, the operations include differential compression techniques that compress the files into compressed files data of smaller size that is more efficiently transported, further details of which are described below. In some embodiments, the data transport system 104 transmits the files data to the data transport system 106. This transportation process may be initiated by either data transport system.

The file storage system 108, at the destination side, is the storage destination for the files from the file storage system 102. The data transports system 106 receives the compressed files data from the data transport system 104. The data transport system 106 performs operations on the compressed files data that are analogues of the operations performed by the data transport system 104, in order to reconstitute or reconstruct the files from the files data. In some embodiments, the data transport system 106 receives the files data from the data transports system 104 through the network 110. The data transport system 106 stores the reconstituted files in the file storage system 108. In some embodiments, the operations performed by the data transports system 106 include techniques to reconstitute or reconstruct the files from differentially compressed files data; the operations reverse the differential compression of the files data performed by the data transport system 104.

The network(s) 110 include any wired or wireless local area network (LAN) and/or wide area network (WAN), such as an intranet, an extranet, or the Internet. It is sufficient that the network 110 provides communication capability between the source side and the destination side, and more particularly communication capability between data transports systems 104 and 106. In some embodiments, the files data are transmitted from the data transport system 104 to the data transport system 106, through the network 110, using the UDP-based Data Transfer Protocol (UDT).

In some other embodiments, the files data is transported from the source side to the destination side without going through the network 110. For example, the files data from the data transport system 104 are copied to a storage device (e.g., a hard disk, an optical disk, flash memory). The storage device is manually transported (e.g., delivery by car) to a location where the data transport system 106 is accessible (e.g., the physical location of the data transport system 106). The files data is copied from the storage device into the data transport system 106. The data transport system 106 processes the files data from the storage device to reconstitute the files for storage into the file storage system 108.

In the description above, the file storage system 102 and the data transport system 104 are designated as the source side, and the file storage system 108 and the data transport system 106 are designated as the destination side, in order to indicate the direction of data transport for purposes of description. Of course, in actual implementations, the systems in the source side can take on the role of systems in the destination side, and vice versa, depending on the actual situation and circumstances and the operations being performed. For example, in a remote backup system, in a backup operation, files at a backup agent (source side) are transported to a remote storage server (destination side). In a restore operation, the sides are reversed; files at the remote storage server (source side) are transported to a backup agent (destination side).

Data Transport Using Differential Compression

Figure 2:
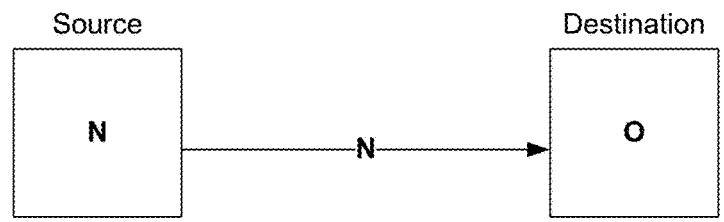
FIG. 2 illustrates an example transmission of a file from a source to a destination in accordance with some embodiments.

Without differential compression technologies, a new version N of a file (or a set of files) is sent from a source (e.g., file storage system 102) to a destination (e.g., file storage system 108) over a network (e.g., network 110) to replace an older version O of the file (or the older version of the set of files), as shown in FIG. 2. For illustrative purposes, the discussion below first addresses the transfer of a file.

Figure 3:
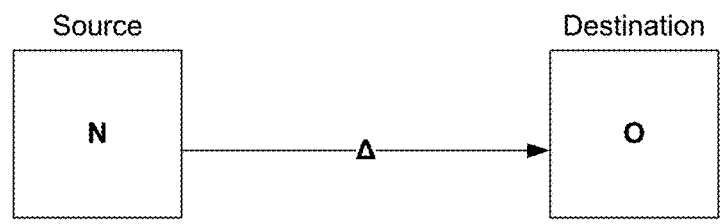
FIG. 3 illustrates an example transmission of a file difference from a source to a destination in accordance with some embodiments.

In some embodiments, the two versions of a file are near-duplicates and the difference between them is relatively small compared to the whole file size. If a difference $\Delta$ between N and O can be determined, and the difference $\Delta$ is transmitted to the destination instead of N in its entirety, as shown in FIG. 3, bandwidth and time can be saved, among other advantages.

In some embodiments, differential compression (which can also be called "de-duplication") is the technique used to determine the differences between two files or two versions of one file. In some embodiments, there are two atomic string edit operations used for differential compression techniques:

a COPY instruction is defined as COPY(srcOffset, destOffset, size); and an ADD instruction is defined as ADD(destOffset, size, data).

Using the two atomic operations, the difference between N and O can be defined as a sequence of COPY and ADD string edit operations. Based on this sequence of COPY and ADD string edit operations, the old version O of a file can be converted into the new version N of the file; the new version N can be reconstituted or reconstructed from the old version O and the difference.

Figure 4:
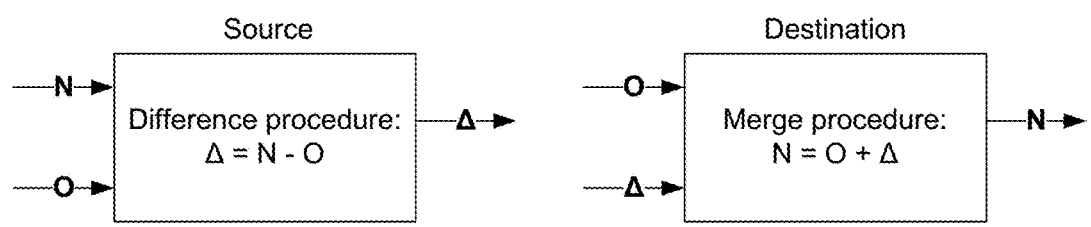
FIG. 4 illustrates an example local differential compression procedure in accordance with some embodiments.

As shown in FIG. 4, a differential compression technique called local differential compression (LDC) includes two procedures:

a difference procedure performed at the source side identifies differences between a reference file O and a target file N, and encodes the differences into a difference $\Delta$ efficiently; and a merge procedure performed at the destination side reconstructs the target file N from O and $\Delta$.

Figure 5:
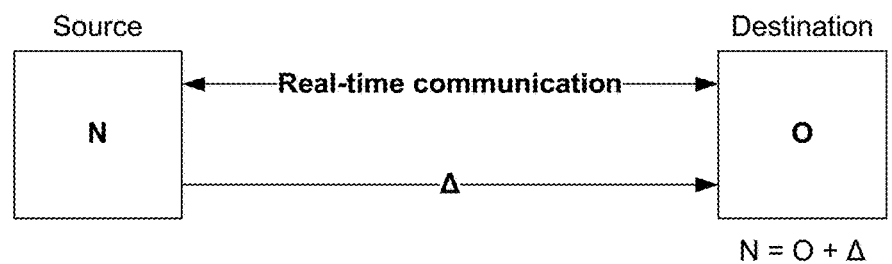
FIG. 5 illustrates an example remote differential compression procedure in accordance with some embodiments.

As shown in FIG. 5, another differential compression technique called remote differential compression (RDC) is a client-server file synchronization technique in which two files are synchronized by communication of the differences. In this case, the differences between the two versions may need to be identified through real-time communication between the source and the destination because neither side initially has information about the file at the other side.

Both LDC and RDC have their respective advantages and drawbacks. For example, while RDC is storage efficient, it takes more time when synchronizing a file between the source side and the destination side. Although LDC calculates the differences offline, which saves the transferring time, it needs more storage for saving the old versions.

Figure 6:
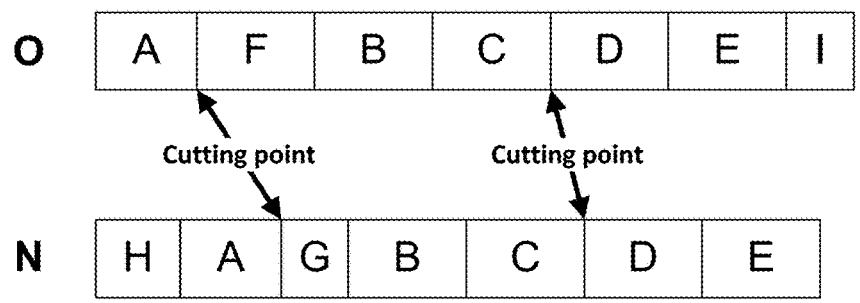
FIG. 6 illustrates an example of file versions divided into chunks in accordance with some embodiments.

In this application, iterative differential compression (IDC) is disclosed that can effectively overcome some issues associated with LDC and RDC. IDC is based on file chunking algorithms that split a file into a sequence of chunks. If two nearly duplicate versions of a file are chunked into two sequences of chunks separately, the two files should have many chunks in common, as shown in FIG. 6 for example. In FIG. 6, O and N have chunks A, B, C, D, and E in common. O has chunks F and I not in common with N, and N has chunks H and G not in common with O.

In some embodiments, cutting points between adjacent chunks are selected by the following approach:

A hash function H(x) is constructed to hash the sub-string of a file starting at the offset x with length w, where w is called sliding window size. For example, the function H(x) may be constructed as a rolling hash function such as a Karp-Rabin function or Adler-32 or the like.

Given a position x in a given string T[1, ..., L], H(x) is calculated over the substring T[x, ..., x+w−1].

Note that there are many techniques to select cutting points based on H. One simple example is to select a cutting point x by letting H(x)≡0 mod p, where p is a predefined prime number, and it can be proved mathematically that it is the average chunk size. One selects the p-value according to the application which may require a range of chunk sizes. For example, a p of around 1021 or 4093 can be selected, etc.

Assuming that a given file F is split into a sequence of chunks $\{c_1, c_2, \ldots, c_n\}$, each chunk is assigned its MD5 hash (or SHA-1 hash) as the chunk identifier or "chunk ID," denoted by CID(C), and the file F can be represented by a sequence of <CID, CPOS, CSIZ>, where CPOS is the chunk offset and CSIZ is the chunk size.

In other words, a view of the file F, which is a new way of expressing a particular version of the file F, can be defined as:

$V(F)=\{<CID(c_1), CPOS(c_1), CSIZ(c_1)>, <CID(c_2), CPOS(c_2), CSIZ(c_2)>, \ldots, <CID(c_n), CPOS(c_n), CSIZ(c_n)>\}$.

In some embodiments, additional information such as file size, the number of chunks and etc., may be included into the view for completeness. But for simplicity and without loss of generality, the simplified representation of the file F as V(F) as shown is used in the description below.

Assuming that V(O), V(N) and N (but not O) are available at the source side (e.g., at file storage system 102), V(O) and V(N) can be used to generate a sequence of COPY/ADD operations that convert the file from O to N. For example, the COPY and ADD instructions involving chunks can be written as:

a COPY instruction is written as COPY(srcOffset, destOffset, chunkSize); and an ADD instruction is written as ADD(destOffset, chunkSize, chunkData).

For the sequence of COPY and ADD operations generated from V(O) and V(N), for ADD operations the chunkData parameter is initially NIL. The chunkData for the ADD operations are then filled with data from N. As such, the IDC from V(O) to N includes:

A difference procedure DIFF(V(O), N) is a procedure at the source side (e.g., at the data transport system 104) that generates Δ and V(N) from V(O) and N, which can be denoted as <Δ, V(N)>=DIFF(V(O), N), and includes the following steps:

a. create the view V(N) from N:N→V(N);
  b. generate a sequence of COPY/ADD operations from <V(N), V(O)>:
    i. COPY(V(O)::CPOS(c), V(N)::CPOS(c), V(N)::CSIZ(c)) where c is a chunk common to O and N; and
    ii. ADD(V(N)::CPOS(d), V(N)::CSIZ(d), NIL) where d is a chunk in N only; and
  c. for each ADD operation, set chunkData=N[V(N)::CPOS(d), V(N)::CSIZ(d)−1].

A merge procedure MERGE(O, Δ) is a procedure at the destination side (e.g., at the data transport system 106) that reconstructs the file N from O and Δ, denoted as N=MERGE (O, Δ), or N=O+Δ.

In some embodiments, there is a sequence of versions of a file F that need to be transferred from the source side to the destination side over the network in a timely manner (e.g., between different data centers supporting the same application). For the sequence $\{F_1, F_2, \ldots, F_n\}$, the IDC can be performed iteratively as follows:

Send $F_1$ to the destination.

Generate difference $\Delta_2$ between $F_2$ and $F_1$. Send difference $\Delta_2$ to the destination. Reconstruct $F_2 = F_1 + \Delta_2$ at the destination.

. . .

Generate difference $\Delta_n$ between $F_{n-1}$ and $F_1$. Send difference $\Delta_2$ to the destination and reconstruct $F_n = F_{n-1} + \Delta_n$ at destination.

Figure 7:
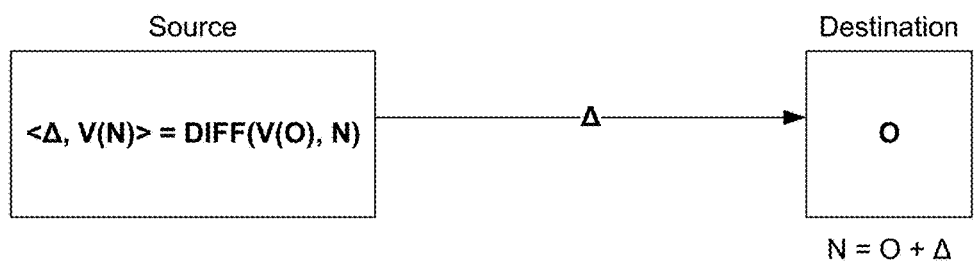
FIG. 7 illustrates an example iterative differential compression procedure in accordance with some embodiments.

As shown in FIG. 7, when applying the VIEW concept, this iterative process can be elaborated as follows:

a. at the source side, start with an initial O at the source side by creating V(O) from O and sending O to the destination side;
  b. at the source side, where O has been updated to N, set <V(N), Δ>=DIFF(V(O), N);
  c. transfer Δ to the destination side (e.g., to data transport system 106). In some embodiments, Δ is transmitted from the source side to the destination side through the network 110. In some other embodiments, other methods are used, such as physical delivery;
  d. at the destination side (e.g., at data transport system 106), let N=MERGE(O, Δ) (and N is stored in the file storage system 108); and
  e. at the source side (e.g., at the file storage system 102), set V(O)=V(N) and wait for next N and return to step b.

Figure 8:
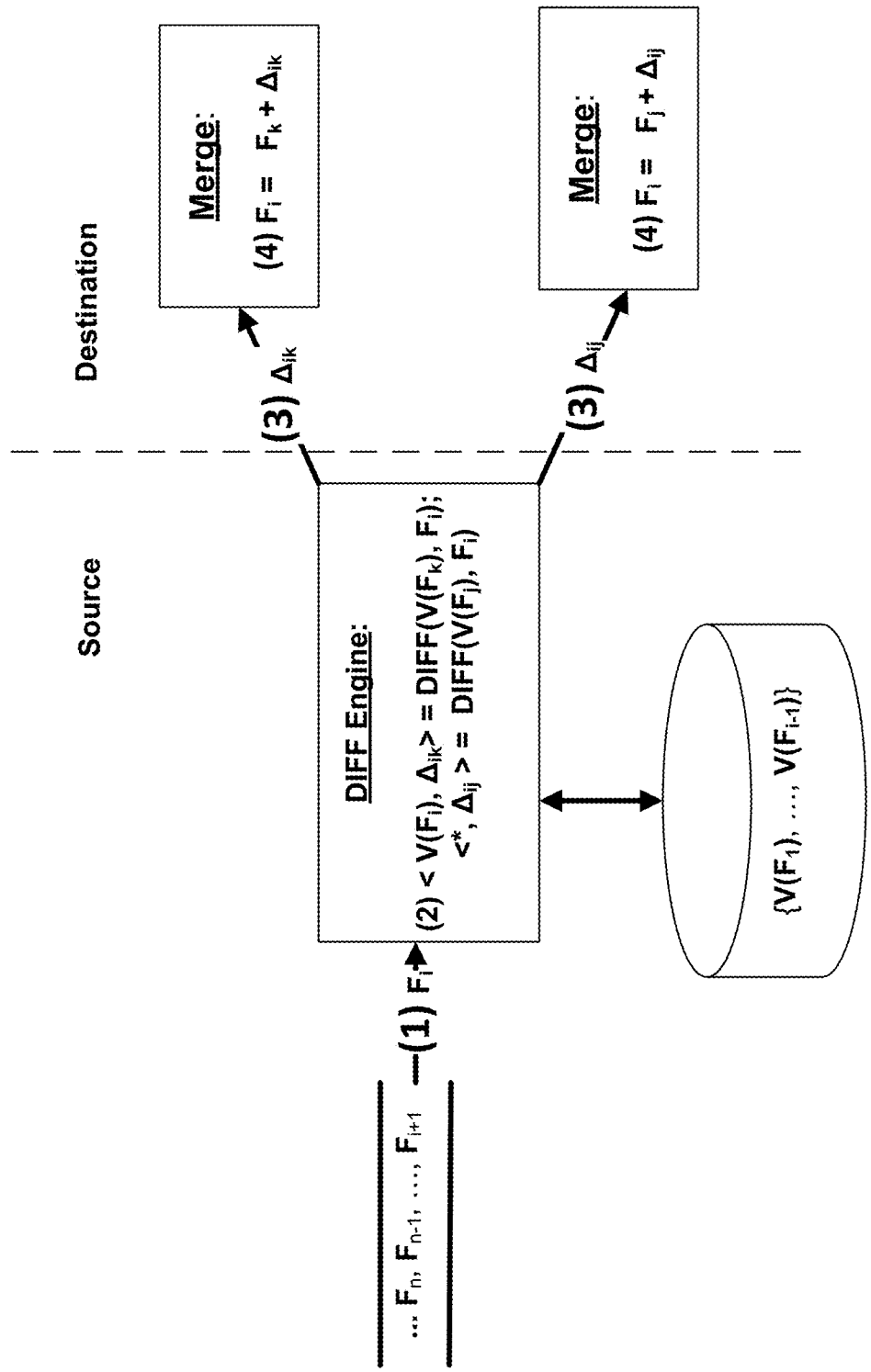
FIG. 8 illustrates an example iterative differential compression procedure in accordance with some embodiments.

In some embodiments, IDC may be used for sending updates from one source to multiple destinations that may contain different previous versions of the current file as shown in FIG. 8. In this case, the source side may need to prepare multiple differences Δ based on the current version of the file at different destinations.

Figure 9:
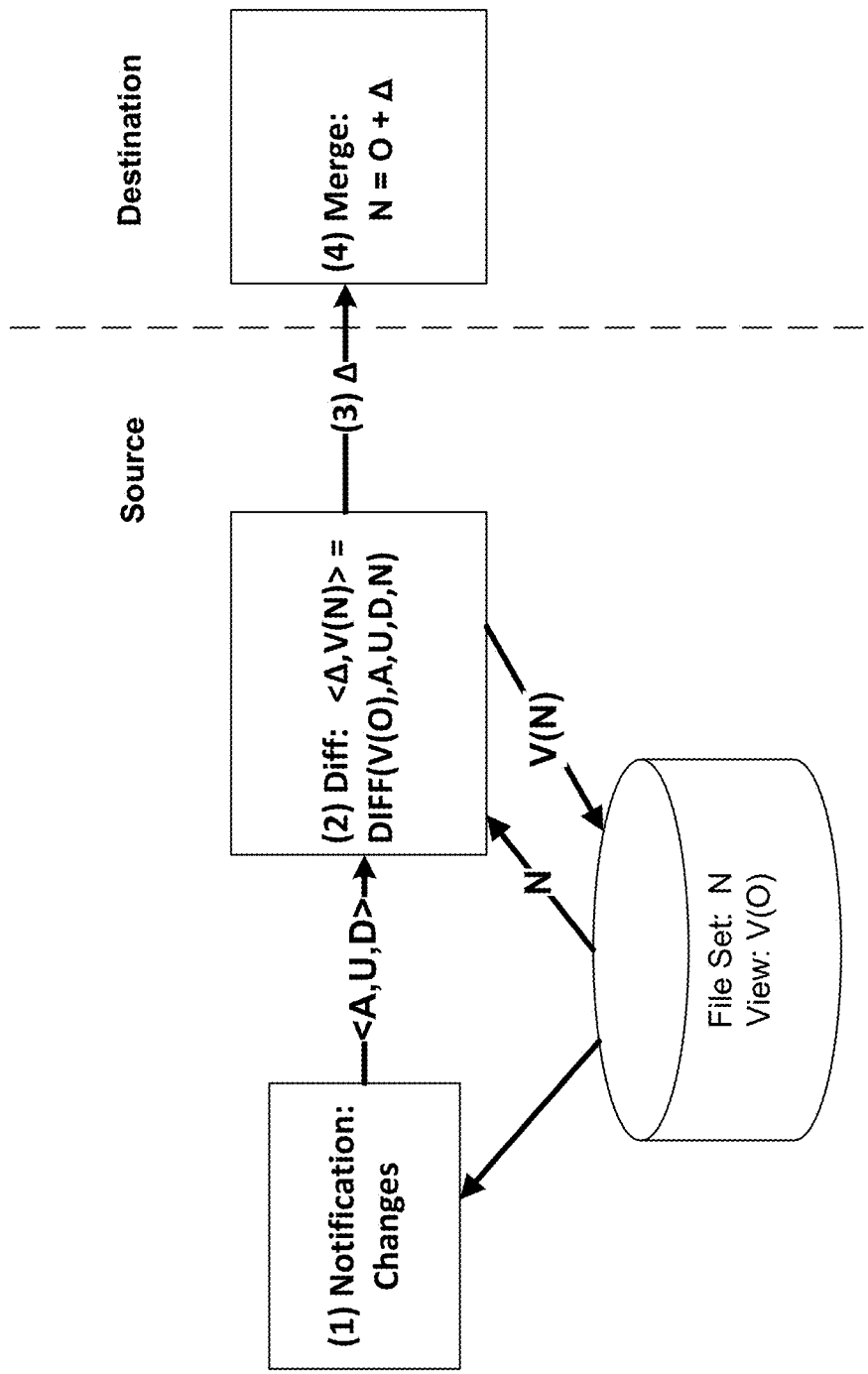
FIG. 9 illustrates an example iterative differential compression procedure in accordance with some embodiments.

In some embodiments, as shown in FIG. 9, the IDC procedure can be extended from differencing of a single file to differencing of a file set based on the same chunk-based techniques described above. In this case, a view represents a file set including one or more files. Assuming that a given file F in a file set is split into a sequence of chunks $\{c_1, c_2, \ldots, c_k\}$:

Assign each chunk its MD5 hash as the chunk ID, denoted by CID(c);

Define the file set using the two tables Tables 1 and 2 below: Tables 1 and 2, which provide an efficient VIEW to represent a file set S, denoted as V(S);

a. Table 1 represents each file with a file ID, its path and a sequence of chunks for each file, where each chunk is represented by a chunk ID;

TABLE 1

| File ID | File Path (Path from the relative root + file name) | Sequence of Chunk IDs |
|---|---|---|
| $FID_1$ | $PATH_1$ | $\{CID^1_1, CID^1_2, \ldots, CID^1_k\}$ |
| ... | ... | ... |
| $FID_p$ | $PATH_p$ | $\{CID^p_1, CID^p_2, \ldots, CID^p_s\}$ | b. Table 2 defines each chunk with an ID, its size and a sequence of its first occurrence in each file that contains the chunk. The occurrence is represented by the file ID and the chunk offset.

TABLE 2

| Chunk ID | Chunk Size | Chunk Information |
|---|---|---|
| $CID_1$ | $CSIZ_1$ | $\{<FID^1_1, CPOS^1_1>, \ldots, <FID^1_z, CPOS^1_z>\}$ |
| ... | ... | ... |
| $CID_q$ | $CSIZ_q$ | $\{<FID^q_1, CPOS^q_1>, \ldots, <FID^q_r, CPOS^q_r>\}$ |

When a file set O is updated, it becomes a new file set N. File set changes includes three types of files:

A—a subset of new files added into the file set N.

D—a subset of files deleted from the file set O.

U—a subset of files updated from file set O to file set N.

The file set level IDC from O to N includes:

A difference procedure DIFF( . . . ) at the source side (e.g., at data transport system 104), which is a procedure that generates Δ and V(N) from V(O), A, U, D and N. The procedure can be denoted as <Δ, V(N)>=DIFF(V(O), A, U, D, N) and includes the following steps:

a. Generate Table 3 below and Table 2 above from <A, U, D>. Tables 2 and 3 form the view V(A, U, D) for <A, U, D>.

TABLE 3

| File ID | File Path | Sequence of Chunk IDs | Type (A/U/D) |
|---|---|---|---|
| $FID_1$ | $PATH_1$ | $\{CID^1_1, CID^1_2, \ldots, CID^1_k\}$ | A |
| ... | ... | ... | |
| $FID_p$ | $PATH_p$ | $\{CID^p_1, CID^p_2, \ldots, CID^p_s\}$ | D | b. For each chunk c in Table 2:
    i. If c is not an existing chunk in V(O), add it to Table 4 below with <CID, CSIZ> and then look at the <FID, CPOS> in Table 2 to copy CDATA from a file with the FID of N into Table 4 below.

TABLE 4

| Chunk ID | Chunk Size | Chunk Data |
|---|---|---|
| $CID_1$ | $CSIZ_1$ | $CDATA_1$ |
| ... | ... | ... |
| $CID_q$ | $CSIZ_q$ | $CDATA_q$ | ii. If c already exists in V(O) and it is associated with the file type D, remove the item from the <FID, CPOS> sequence of chunk information for CID in Table 2, and if the chunk information sequence for CID in Table 2 becomes NIL, remove the record from Table 2 for CID. In other words, V(A, U, D) is being modified.

c. Set Δ=<V(A, U, D), Table 4>;
  d. Construct V(N) from V(O) and V(A, U, D), i.e., <V(O), V(A, U, D)>→V(N). For each FID in Table 3:
    i. For type A—Add this record to V(O)::Table 1.
    ii. For type U—Replace the sequence from Table 1 with the sequence from Table 3.
    iii. For type D—Delete the record from Table 1 with the same FID. For any associated chunk CID that does not belong to any FID, remove the record with CID from V(O)::Table 2.
  e. Set V(N) when step d is completed.

A merge procedure MERGE(O, Δ) at destination, which is a procedure to reconstruct the file N from O and Δ, denoted as N=MERGE(O, Δ), or N=O+Δ.

a. For each FID in V(A, U, D)::Table 3:
    i. Type D—with the PATH, delete the file in place;
    ii. Type U—use the record from V(A, U, D)::Table 3, V(A, U, D)::Table 2 and Table 4 to reconstruct the file that may copy the chunk from the old file in place or get CDATA from Table 4.
    iii. Type A—use the record from V(A, U, D)::Table 3, V(A, U, D)::Table 2 and Table 4 to construct a new file that may copy the chunk from an old file or get CDATA from Table 4.
  b. After step a, let N=MERGE(O, Δ), also denoted as N=O+Δ.

Note that the DIFF procedure creates V(N) from V(O) and V(A, U, D) instead of N itself, thus making the process more efficient. As show in FIG. 9, the process of updating a file set has four phases. At the source side, the system notifies all file changes from O to N (e.g., the file storage system 102 notifies data transports system 104). The changes include adding new files (A), file modifications (U) and file deletions (D) which are represented by (A, U, D). The system then uses the differential compression (or de-duplication) process to generate Δ from O and N and transfer Δ over the network to the destination. As noted above, transferring Δ can be performed, for example, over the network (e.g., network 110) or performed manually (e.g., by physical delivery of a storage device containing Δ). At the destination, the system performs the MERGE procedure that constructs N from O and Δ.

The description above describes Tables 1-4 and operations performed with respect to these tables. It should be appreciated that the references to Tables 1-4 above are for ease of description and understanding. In actual implementations, the operations are performed with respect to respective data structures corresponding to these tables in the respective views.

Figure 10:
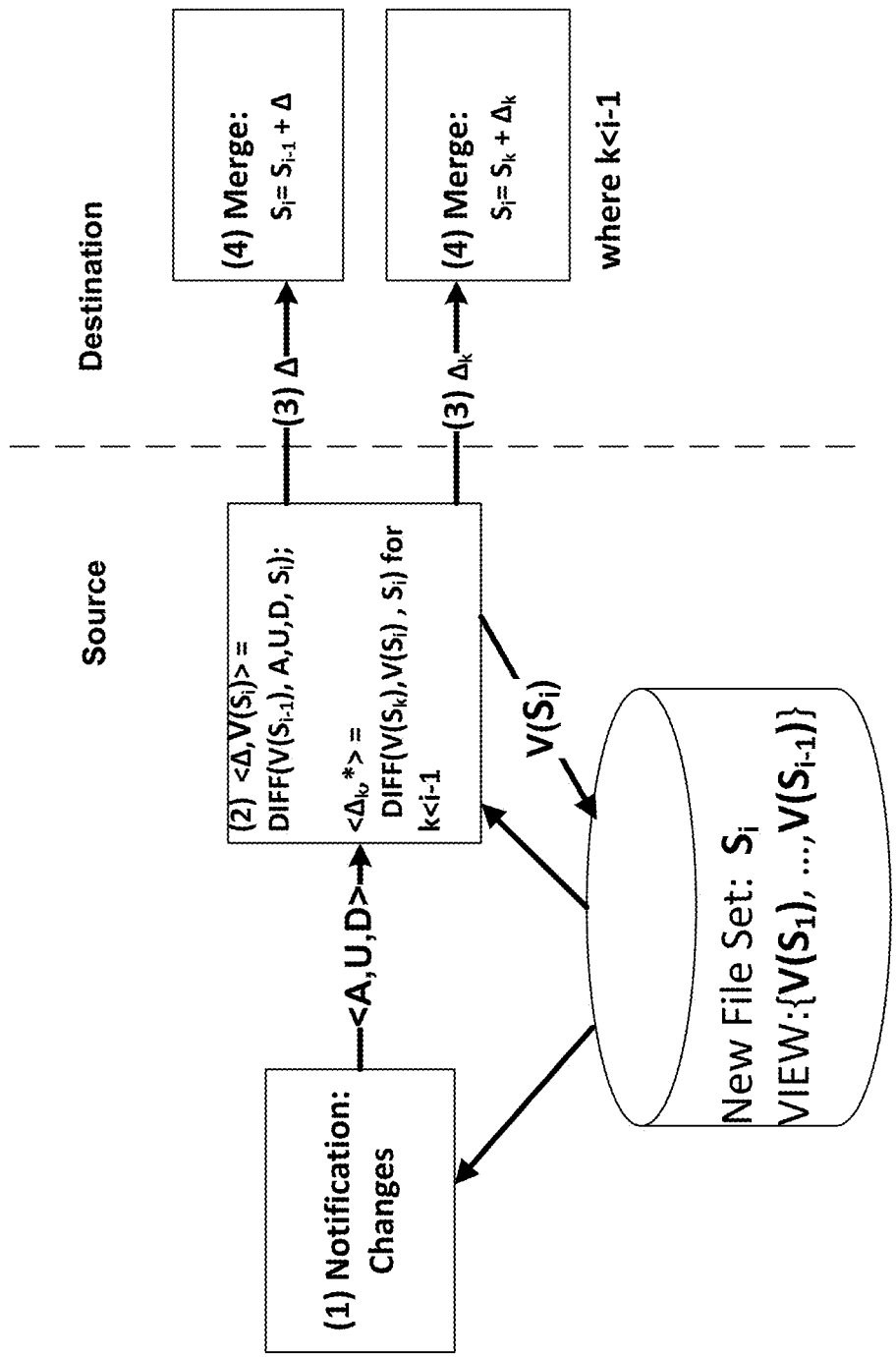
FIG. 10 illustrates an example iterative differential compression procedure in accordance with some embodiments.

In some embodiments, the file set level IDC can handle the one source & multiple destinations update, as shown in FIG. 10. In FIG. 10, respective differences are determined depending on the current version of the file set S at the respective destinations. Thus, a respective destination gets the appropriate respective difference for reconstructing the current version of S from the respective difference and the version of S that is at the destination.

In some embodiments, in the data transport system 100 (FIG. 1) and following the examples described above with reference to FIGS. 8-10, at the source side, the files (or file sets) (e.g., the new versions) are stored in the file storage system 102. The data transport system 104 includes the modules (e.g., DIFF engine) for determining differences, as well as views of files (or of file sets). The views themselves are stored in the file storage system 102 or in the data transport system 104. The data transport system 104 is notified of changes to files (or to file sets) in the file storage system 102. The data transport system 104 uses the changes (e.g., <A, U, D>) to ultimately determine the difference that is transported to the destination side. At the destination side, the data transport system 106 includes the modules (e.g., MERGE module or engine) that reconstruct the new versions of files (and of file sets) from the old versions and the differences. The reconstructed new versions are stored in the file storage system 108.

Figure 11:
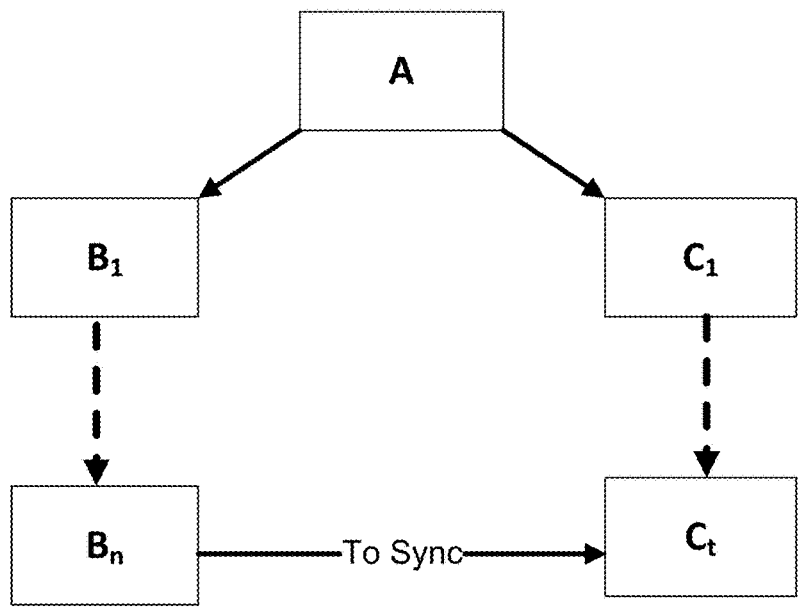
FIG. 11 illustrates a diagram of file sets to be synchronized after evolving independently from the same original file set, in accordance with some embodiments.

In some embodiments, there is a need to synchronize two sets of files across the network when one set has no knowledge of the other one. For example, the two sets of files may evolve from the same set as shown in FIG. 11.

Figure 12:
FIG. 12 illustrates a diagram of views of file sets in accordance with some embodiments.

The concept of VIEW of a file set can be used for file set synchronization as well. First, the file set synchronization problem can be defined as two similar file sets R and T at two ends of the network as shown in FIG. 12. Their views V(R) and V(T) are available and updated to be current.

Figure 13:
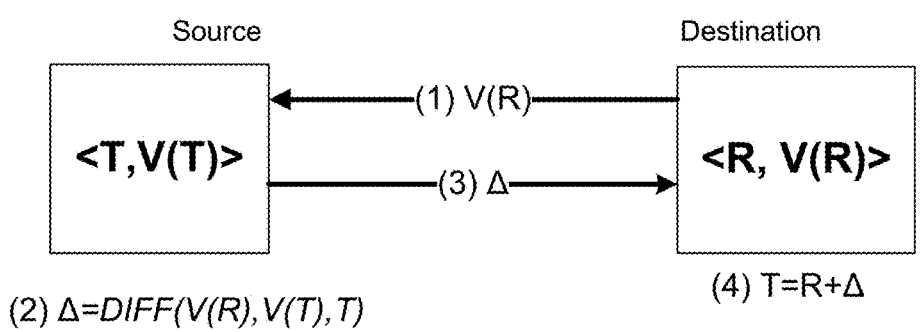
FIG. 13 illustrates an example file set synchronization process, in accordance with some embodiments.

In some embodiments, as shown in FIG. 13, the file set synchronization is performed as the following steps:
  a. V(R) was sent from the destination side to the source side, where we have <T, V(T)>;
  b. Use a difference procedure DIFF(V(R), V(T), T) to generate Δ:
    i. Use V(R), V(T) to create a sequence of COPY/ADD operations.
    ii. Use T to fill the chunk data for each ADD operation in the sequence.
  c. Send Δ to the destination side;
  d. Perform a merge procedure MERGE(R, Δ) at the destination side to reconstruct the file set T from R and Δ, denoted as T=MERGE(R, Δ), or T=R+Δ.

In some embodiments, the data transferring for V(R) and Δ can be done using a UDP-based file transport protocol.

In some embodiments, in the data transport system 100 (FIG. 1) and following the examples described above with reference to FIGS. 11-13, at the source side, the files (or file sets) (e.g., T in FIG. 13) are stored in the file storage system 102. The data transport system 104 includes the modules (e.g., a DIFF module) for receiving the views of the files (or of the file sets) at the destination side (e.g., V(R) in FIG. 13) and determining differences, as well as views of files (or of file sets). The views themselves are stored in the file storage system 102 or in the data transport system 104. The data transport system 104 uses the view of the files (or of the file sets) at the destination (e.g., V(R)) and the files (or the file sets) at the source and the views thereof (e.g., T and V(T)) to ultimately determine the difference that is to be transported to the destination side. At the destination side, the data transport system 106 includes the modules (e.g., a MERGE module) that reconstruct the desired files (and file sets) (e.g., T) from the files (and the file sets) at the destination (e.g., R) and the differences. The reconstructed files (and file sets) are stored in the file storage system 108.

Figure 14:
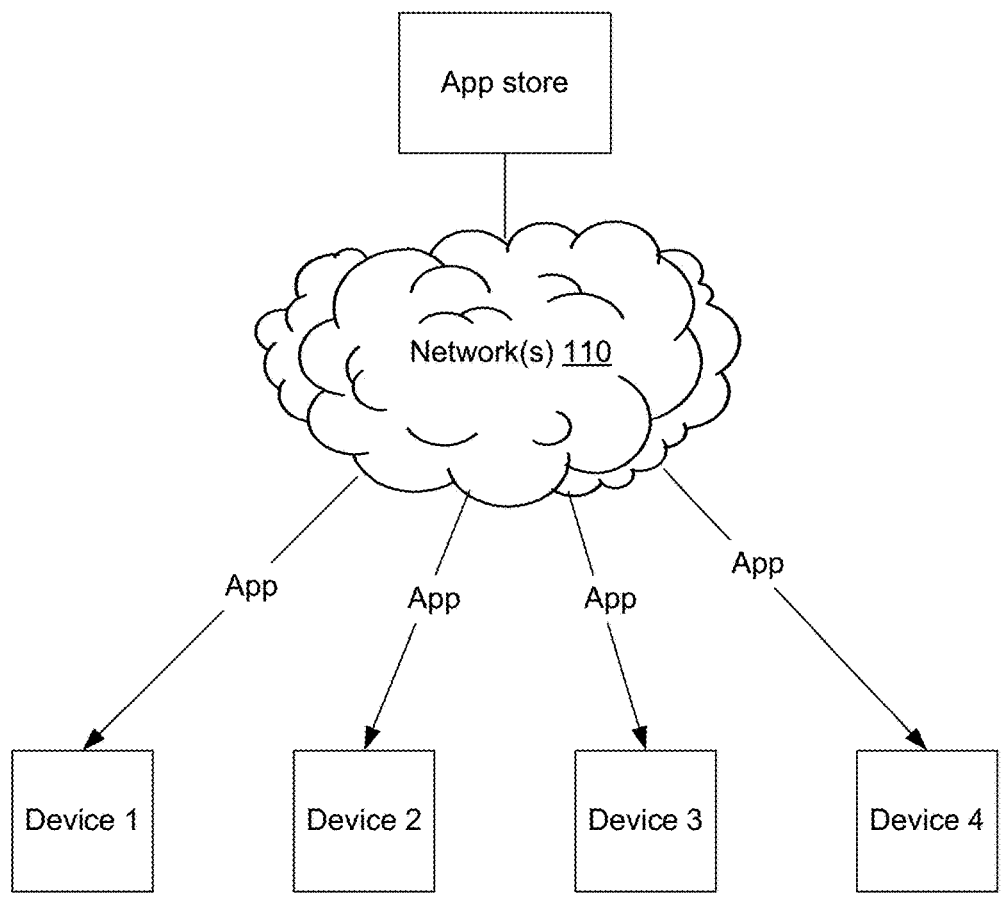
FIG. 14 illustrates an example of a mobile application upgrade use case, in accordance with some embodiments.

In some embodiments, there are many versions of a file set at one location and one needs to send different versions of the file set over the network for file updating purposes. One example is upgrading of mobile application software as shown in FIG. 14.

Traditional approaches to file set updating incorporate a tree model that presents hierarchical structures of file directories. Two file sets (e.g., an old version and a new version of a file set) can be presented as respective trees of files, for example. There is a one-to-one mapping between two sets of files that maps each node on the tree corresponding to one file set to a node on the tree corresponding to the other file set based on heuristic rules. The heuristics rules include, for example, that the pair of nodes (either files or directories) have the same name, and that the parent nodes of both nodes are mapped.

In the traditional approach, the procedure for determining the differences includes applying LDC to mapped node pairs one by one. If a node in the tree corresponding to the new version of the file set has no mapped node, that whole node is encoded without applying any differential compression because it is deemed to a new addition to the file set.

Figure 15:
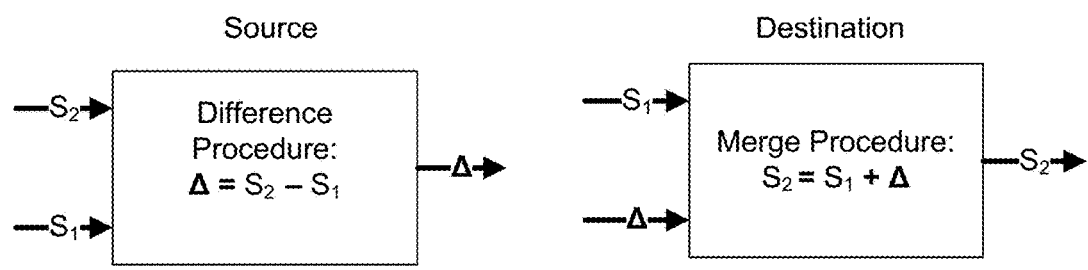
FIG. 15 illustrates an example file set differencing and updating process, in accordance with some embodiments.

FIG. 15 illustrates an example implementation of a file set level differencing and updating. In FIG. 15, a difference $\Delta$ between file sets $S_2$ and $S_1$ is determined at the source side. The $\Delta$ is sent to the destination, where file set $S_2$ is reconstructed from $S_1$ and $\Delta$ at the destination side.

Figure 16:
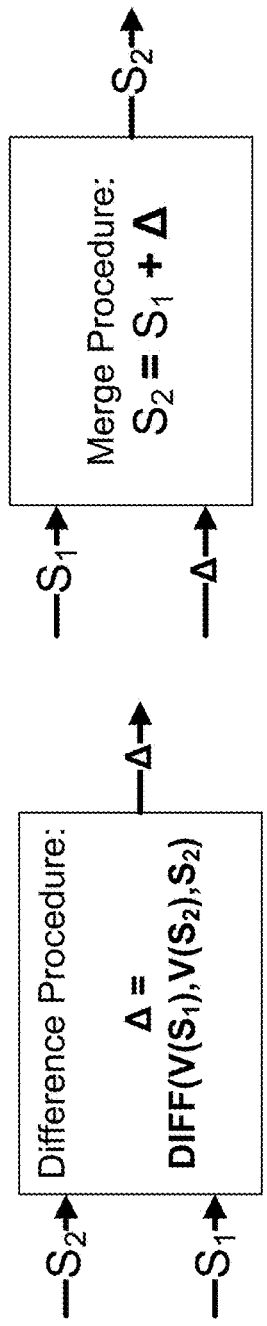
FIG. 16 illustrates an example file set local differential compression process in accordance with some embodiments.
Figure 17:
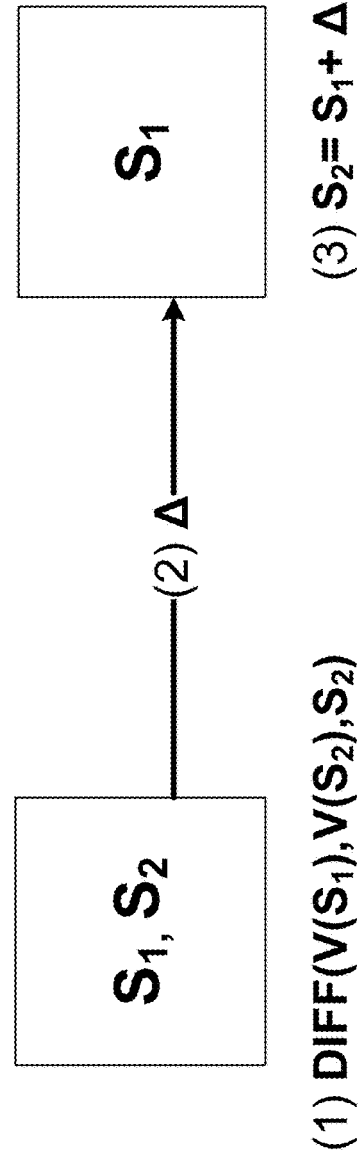
FIG. 17 illustrates an example file set local differential compression process in accordance with some embodiments.

As shown in FIGS. 16 and 17, using the VIEW of a file set, the file set LDC can be performed as following steps:

At the source side:
i. Create $V(S_1)$ from $S_1$ and save $V(S_1)$ if $V(S_1)$ does not exist yet;
ii. Create $V(S_2)$ from $S_2$ and save it $V(S_2)$;
iii. Use the difference procedure $DIFF(V(S_1), V(S_2), S_2)$ to calculate $\Delta$;
iv. Send the difference $\Delta$ to the destination side;

At the destination side:
i. Perform a merge procedure $MERGE(S_1, \Delta)$ to reconstruct the file set $S_2$ from $S_1$ and $\Delta$, denoted as $S_2=MERGE(S_1, \Delta)$, or $S_2=S_1+\Delta$.

In some embodiments, LDC techniques are performed for two individual files or for two file sets, each including multiple files, using a byte-level differential compression algorithm. A byte-level approach for two individual files has the following features:

The difference between two files is expressed in the form of a sequence of COPY/ADD edit operations;
The difference algorithms identify common sub-strings between two files which actually create a sequence of COPY operations;
The ADD operations can be derived from the COPY sequence.

In some embodiments, the byte-level approach provides fine grain differential compression and often has a better compression rate. Assuming that a fingerprint generation procedure FG(F) is performed for a given file F, the byte-level approach for two file sets can be performed as follows:

For a first file set $S_1$, a set of fingerprints for files in the file set $S_1$ is generated and each file is assigned a unique file ID. A first fingerprint database FPDB1 including the set of fingerprints is created.

For files in a second file set $S_2$, the fingerprint generation procedure FG(F) is invoked to generate a set of fingerprints and index them into a second fingerprint database FPDB2 sequentially:
or each file fin $S_2$, fingerprints off are generated.
FPDB2 is searched for matches to fingerprints in FPDB1 to determine whether there exists a previously indexed file g in FGDB1 such that f and g are nearly duplicated;
If yes, a byte-level difference engine (e.g., xdelta) is used to generate the difference $\delta=f-g$;
Otherwise, the fingerprints in FPDB2 are used to match fingerprints in FPDB1 to determine whether there exists a file F from $S_1$ that matches fin terms of near-duplication. If yes, the difference $\delta=f-F$ is generated; otherwise f is encoded as a new file using one or more fingerprints and the fingerprints are indexed into FPDB2.
Encode all $\delta$+new files+other metadata into a whole difference package $\Delta$.

In some other embodiments, for the two file sets $S_1$ and $S_2$, both $V(S_1)$ and $V(S2)$ are generated, and then the following operations are performed:
For each file node in $S_2$, the nearest duplicate node in $S_1$ is identified if the number of common chunks presented by $V(S_1)$ and $V(S_2)$ exceeds a predefined threshold. Otherwise, the file node in $S_2$ is deemed to be a new node;
For each pair of nodes, the LDC approach is applied to calculate the difference between the two file nodes in the pair.
Encode the whole difference as $\Delta$.

In some embodiments, in the data transport system 100 (FIG. 1) and following the examples described above with reference to FIGS. 15-17, at the source side, the files (or file sets) (e.g., $S_1$ and $S_2$) are stored in the file storage system 102. The data transport system 104 includes the modules (e.g., a DIFF module) for determining differences, as well as views of files (or of file sets). The views themselves are stored in the file storage system 102 or in the data transport system 104. The data transport system 104 uses the view of the files (or of the file sets) (e.g., $V(S_1)$ and $V(S_2)$) and the files (or file sets) at the source (e.g., $S_1$ and $S_2$) to ultimately determine the difference that is transported to the destination side. At the destination side, the data transport system 106 includes the modules (e.g., a MERGE module) that reconstruct the desired files (or file sets) (e.g., $S_2$) from the files (or the file sets) at the destination (e.g., $S_1$) and the differences. The reconstructed files (or file sets) are stored in the file storage system 108.

Figure 18:
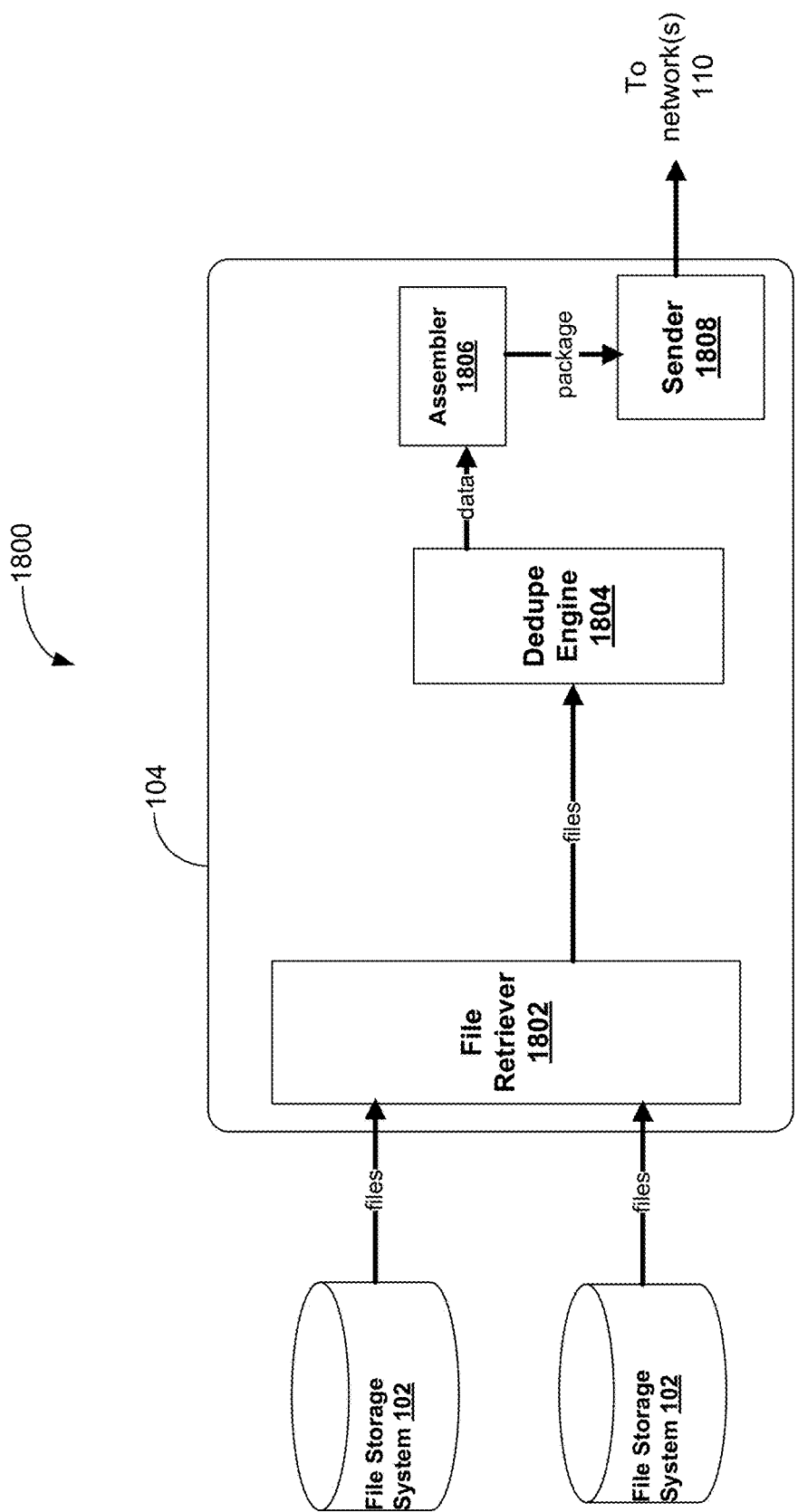
FIG. 18 illustrates an example workflow through a data transport system in accordance with some embodiments.

FIG. 18 illustrates a file processing workflow 1800 at the source side in accordance with some embodiments. The differential compression techniques described above may be performed by workflow 1800. Files to be transported to the destinations side are stored at the file storage system 102. A file retriever module 1802 at the data transport system 104 retrieves the files to be transported from the file storage system 102. The file retriever 1802 passes the files to a dedupe engine or module 1804, which performs the differential compression techniques described above to determine the views and the differences. The views may be stored in the data transport system 104 and/or in the file storage system 102. The differences data is passed onto an assembler module 1806, which assembles the differences data into one or more data packages (e.g., the differences data and corresponding metadata) suitable for transport to the destination side. A sender module 1808 sends the data packages to the network 110 en route to the destination side (e.g., to data transport system 106).

In some embodiments, the files at the source side are categorized according to their file sizes before file differences are determined. Files vary by size, and handling them all in the same way regardless of size may lead to waste of resources (e.g., bandwidth, processing power). By categorizing the files according to size, so that files of a certain size range are handled one way and files of another size range are handled another way, resources may be used more efficiently.

In some embodiments, the files are categorized into four categories based on file size. Each category corresponds to a defined size range. For example, a "tiny files" category corresponds to files ("tiny" files) having a size smaller than 4 KB, a "small files" category corresponds to files ("small" files) having a size between 4 KB and 512 KB, a "normal files" category corresponds to files ("normal" files) having a size between 512 KB and 2 GB, and a "large files" category corresponds to files ("large" files) having a size of 2 GB or larger. Files in the "tiny files" category are transported to the destination side as is; differential compression techniques are not applied to these files. The differential compression techniques described above are applied to the files in the "normal files" category as they are. A file in the "large files" category is divided into segments of up to a defined maximum size (e.g., a file size in the "normal files" category, such as 256 MB), and the differential compression techniques described above are applied to each segment as if each file segment is an individual file in the "normal files" category. Files in the "small files" category are grouped together to create a group of files whose total file size is in another category (e.g., the "normal files" category), and the group is processed as if the group is a file in another category. For example, if the group's total size corresponds to the "normal files" category, such as 256 MB, the group is treated as if the group is a file in the "normal files" category.

It should be appreciated that the file size categories described above and the corresponding file size ranges are merely exemplary. More or less categories, as well as different size ranges for the respective categories, are possible.

Figure 19:
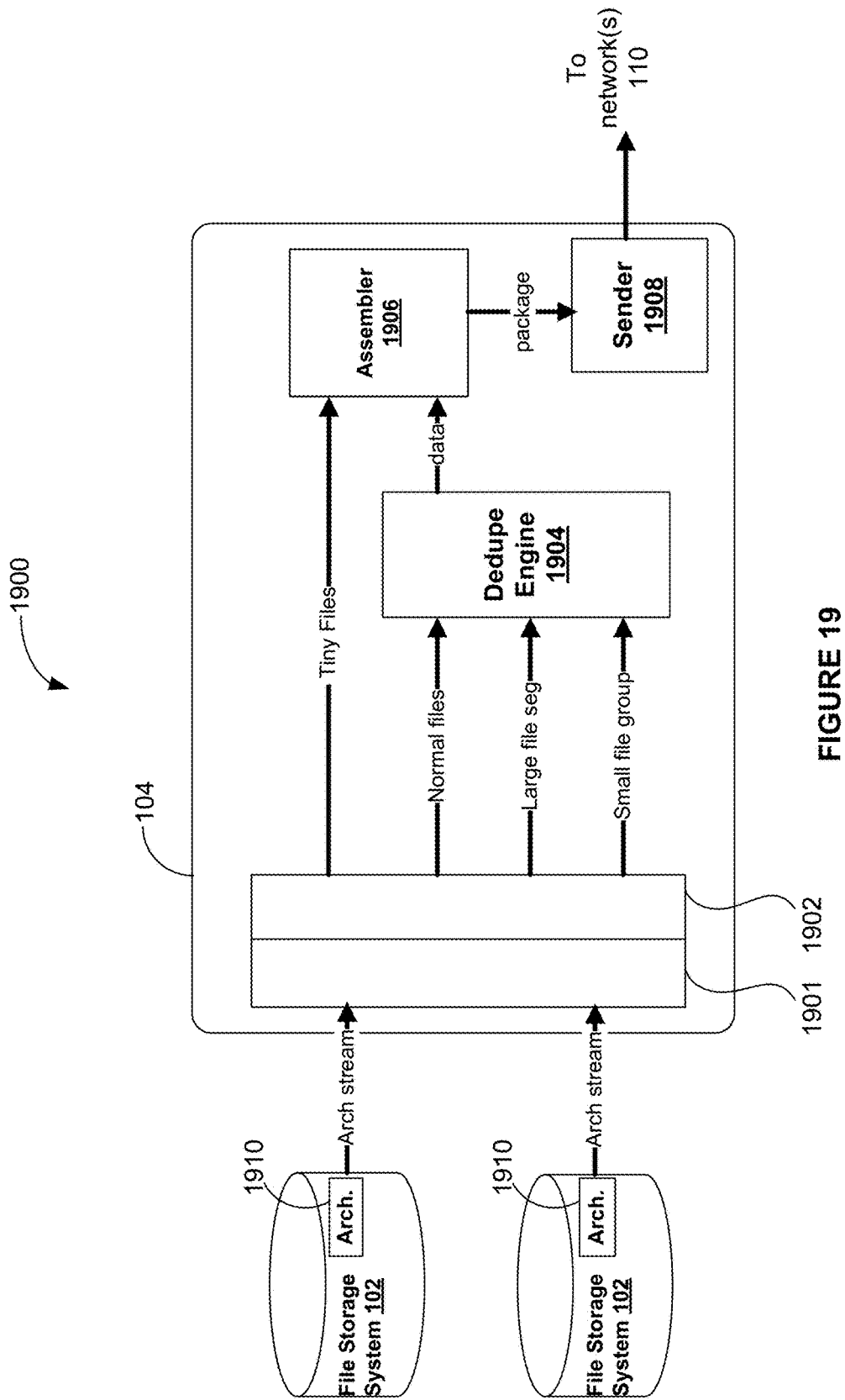
FIG. 19 illustrates an example workflow through a data transport system in accordance with some embodiments.

FIG. 19 illustrates a file processing workflow 1900 at the source side in accordance with some embodiments. The differential compression techniques described above, combined with categorization of files by file size, may be performed by workflow 1900. Files to be transported to the destinations side are stored at the file storage system 102. An archiving module 1910 collects the files into an archival stream (e.g., a stream in the tar archive format). A file retriever module 1901 at the data transport system 104 retrieves the archival streams from the file storage system 102. The file retriever 1901 passes the archival streams to a stream handler module 1902, which categorizes the files contained within the archival streams according to file size and processes the files accordingly.

The stream handler 1902 passes files in the "tiny files" category directly to an assembler module 1906. The stream handler 1902 passes files in the "normal files" category as is to a dedupe engine or module 104. The stream handler divides files in the "large files" category into segments and passes the segments to the dedupe engine 1904. The stream handler groups files in the "small files" category into groups and passes the groups to the dedupe engine 1904. The dedupe engine 1904 determines views and differences data for the files, segments, and groups. The views may be stored in the data transport system 104 and/or in the file storage system 102. The differences data is passed onto an assembler module 1906, which assembles the differences data and the files in the "tiny files" category into one or more data packages (e.g., the differences data and corresponding metadata, files and corresponding metadata) suitable for transport to the destination side. A sender module 1908 sends the data packages to the network 110 en route to the destination side (e.g., to data transport system 106).

Figure 20:
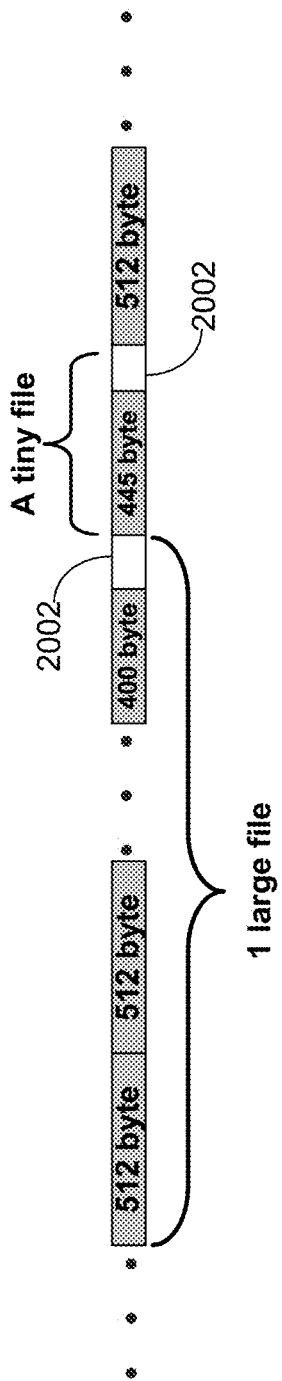
FIG. 20 illustrates an example file archival stream in accordance with some embodiments.

As described above, files may be retrieved from the file storage system 102 as an archival stream. As shown in FIG. 20, an archival stream is a sequence of blocks, where the block size is 512 bytes. Each file takes one or more consecutive blocks:

If file size is less than or equal to 512 bytes, the file takes up one block;

If 512*m<file size≤512*(m+1), the file occupies (m+1) blocks.

Two files do not share a block. Thus, if a block is not filled up by a single file, the block is filled with padding bytes 2002.

The stream handler 1902 processes the files in the streams according to their sizes as follows:

A file in the "tiny files" category is sent to the next process (e.g., assembler module 1906) directly.

A file in the "normal files" category is sent to the dedupe engine 1904 for de-duplication.

A file in the "large file" category is split it into a sequence of segments, each with a predefined size corresponding to the "normal files" category (e.g., 256 MB), with the last segment for the file having a size less than or equal to the predefined size. Alternatively, the segment size is defined per file so that the file is divided into approximately equally sized segments. Then the segments are sent to the dedupe engine 1904 for de-duplication.

Figure 21:
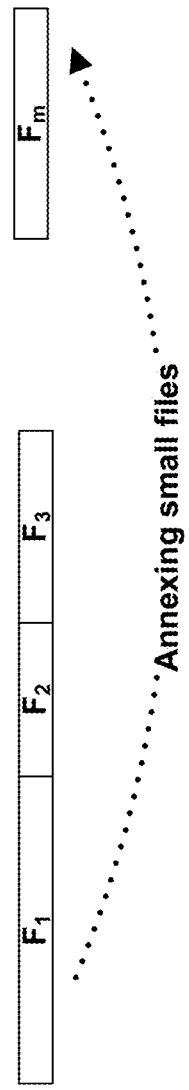
FIG. 21 illustrates an example annexation of a small file in accordance with some embodiments.

A file in the "small files" category is picked from the stream, and the stream handler 1902 waits for the next "small file," and so on. The "small files" are annexed together (as shown in FIG. 21) into a group, and the group is sent to the dedupe engine 1902 for de-duplication.

In some embodiments, the chunk sizes vary depending on the differential compression technique used. For example, for the updating (FIGS. 7-10) and syncing (FIGS. 11-13) techniques, chunk sizes can be relatively large (e.g., 1 KB, 4 KB or even larger). For the differencing technique (FIGS. 14-17), the chunk sizes are relatively smaller (e.g., 31, 61, or 91 bytes).

In some embodiments, a unified data transport platform is built on top of the differential compression techniques described above, as shown in FIG. 22A, to support the applications described above (e.g., remote backup, file replication, disaster recovery, etc.). For example, the update module 2202 corresponds to the differential compression techniques described above with reference to FIGS. 7-10. The sync module 2204 corresponds to the differential compression techniques described above with reference to FIGS. 11-13. The delta module 2204 corresponds to the differential compression techniques described above with reference to FIGS. 14-17.

FIG. 22B shows the unified data transport platform built on top of the differential compression techniques described above, as in FIG. 22A, but with an additional stream module 2208, on top of which the update module 2202, sync module 2204, and delta module 2206 can be built. The stream module 2208 handles the retrieval of archival streams from the file storage system and categorizing of files by size as described above with reference to FIGS. 19-21.

Figure 23:
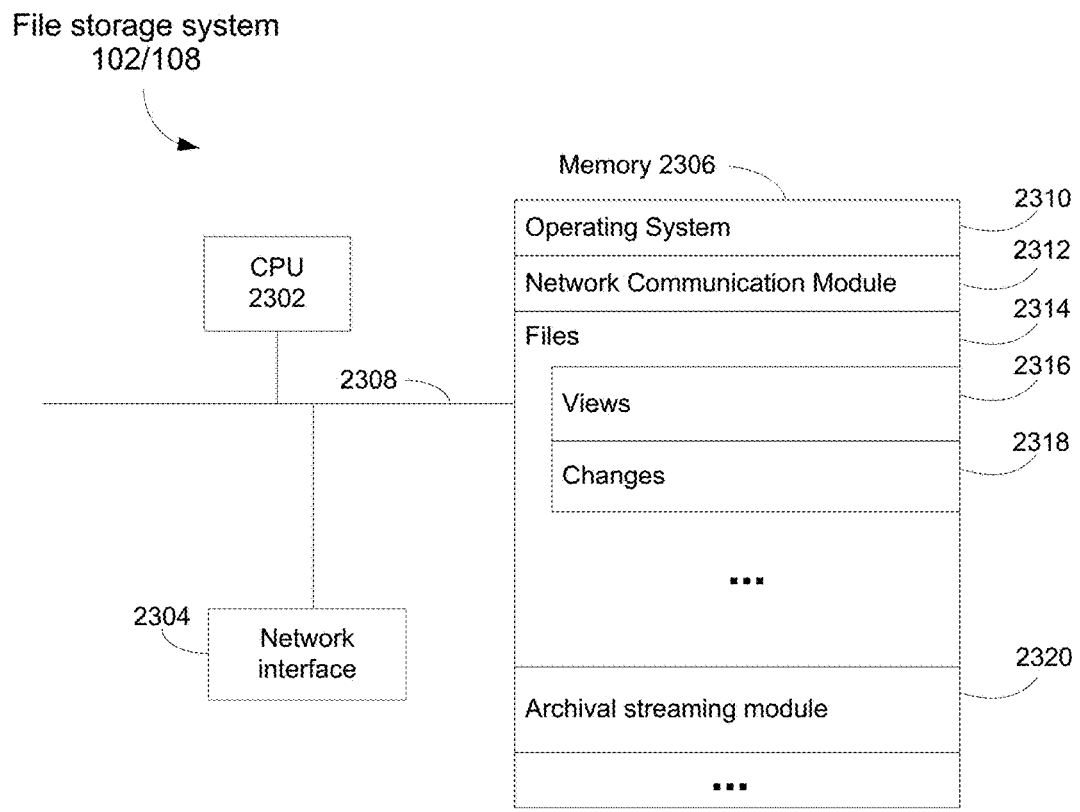
FIG. 23 is a block diagram illustrating a file storage system in accordance with some embodiments.

FIG. 23 is a block diagram illustrating a file storage system 102/108 in accordance with some embodiments. The file storage system 102/108 typically includes one or more processing units (CPU's) 2302, one or more network or other communications interfaces 2304, memory 2306, and one or more communication buses 2308 for interconnecting these components. The communication buses 2308 optionally include circuitry (sometimes called a chipset) that interconnects and controls communications between system components. Memory 2306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2306 may optionally include one or more storage devices remotely located from the CPU(s) 2302. Memory 2306, including the non-volatile and volatile memory device(s) within memory 2306, comprises a non-transitory computer readable storage medium. In some embodiments, memory 2306 or the non-transitory computer readable storage medium of memory 2306 stores the following programs, modules and data structures, or a subset thereof, including an operation system 2310, a network communication module 2312, files 2314, and an archival streaming module 2320.

The operating system 2310 includes procedures for handling various basic system services and for performing hardware dependent tasks.

The network communication module 2312 facilitates communication with other systems via the one or more communication network interfaces 2304 (wired or wireless) and one or more communication networks, such as the Internet, other wide area networks, local area networks, metropolitan area networks, and so on.

The files 2314 are files stored at the file storage system 102/108. Files 2314 are transported from a source-side file storage system 102 to a destination-side file storage system 108, and replace at the file storage system 108 older or different versions of the files. In some embodiments, the files are grouped into, and processed as, file sets of multiple files.

The file storage system 102/108 also includes views 2316 of the files 2314. A view 2316 defines a file as a sequence of chunks, as described above.

Changes 2318 track changes in the files 2314. Changes 2318 include records of new files, updated files, and deleted files. Changes 2318 are reported to the data transport system 104.

Archival streaming module 2320 packages files or file sets 2314 as archival streams (e.g., stream in a tar format), which are sent to the data transport system 104/106.

Each of the above identified elements may be stored in one or more of the previously mentioned memory devices, and each of the modules or programs corresponds to a set of instructions for performing a function described above. The set of instructions can be executed by one or more processors (e.g., the CPUs 2302). The above identified modules or programs need not be implemented as separate software programs, procedures or modules, and thus various subsets of these modules may be combined or otherwise re-arranged in various embodiments. In some embodiments, memory 2306 may store a subset of the modules and data structures identified above. Furthermore, memory 2306 may store additional modules and data structures not described above.

Although FIG. 23 shows a file storage system, FIG. 23 is intended more as functional description of the various features which may be present in a file storage system than as a structural schematic of the embodiments described herein. In practice, and as recognized by those of ordinary skill in the art, items shown separately could be combined and some items could be separated. For example, some items (e.g., operating system 2310 and network communication module 2312 shown separately in FIG. 23 could be implemented on single servers and single items could be implemented by one or more servers. The actual number of servers and storage devices used to implement the file storage system 102/108 and how features are allocated among them will vary from one embodiment to another, and may depend in part on the amount of data traffic that the system must handle during peak usage periods as well as during average usage periods.

Figure 24:
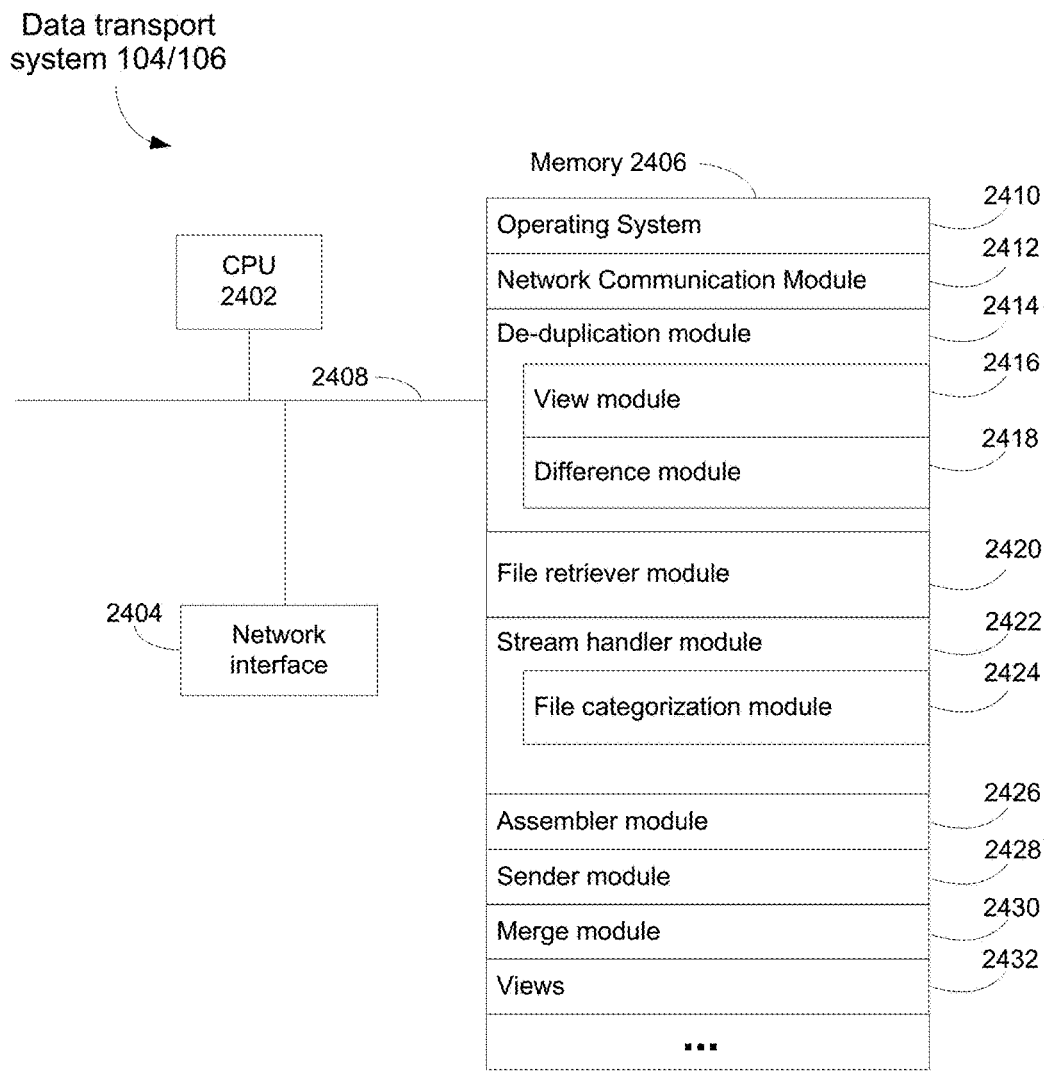
FIG. 24 is a block diagram illustrating a data transport system in accordance with some embodiments.

FIG. 24 is a block diagram illustrating a data transport system 104/106 in accordance with some embodiments. The data transport system 104/106 typically includes one or more processing units (CPU's) 2402, one or more network or other communications interfaces 2404, memory 2406, and one or more communication buses 2408 for interconnecting these components. The communication buses 2408 optionally include circuitry (sometimes called a chipset) that interconnects and controls communications between system components. Memory 2406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 2406 may optionally include one or more storage devices remotely located from the CPU(s) 2402. Memory 2406, including the non-volatile and volatile memory device(s) within memory 2406, comprises a non-transitory computer readable storage medium. In some embodiments, memory 2406 or the non-transitory computer readable storage medium of memory 2406 stores the following programs, modules and data structures, or a subset thereof, including an operation system 2410, a network communication module 2412, de-duplication module 2414, file retriever module 2420, stream handler module 2422, assembler module 2426, sender module 2428, merge module 2430, and optionally views 2432.

The operating system 2410 includes procedures for handling various basic system services and for performing hardware dependent tasks.

The network communication module 2412 facilitates communication with other systems via the one or more communication network interfaces 2404 (wired or wireless) and one or more communication networks, such as the Internet, other wide area networks, local area networks, metropolitan area networks, and so on.

The de-duplication module 2414 applies differential compression (e.g., the differential compression techniques described above) to files and file sets. The de-duplication module 2414 includes a view module 2416 for generating the views of files and file sets, and a difference module 2418 for determining the difference between files and between file sets.

The file retriever module 2420 retrieves files 2314 (as files, file sets, or archival streams) and views 2316 from the file storage system 102/108.

The stream handler module 2422 processes archival streams retrieved from the file storage system 102/108. In some embodiments, the stream handler module 2422 includes a file categorization module 2424 that categorizes files according to size, in order that the files are processed according to size.

The assembler module 2426 assembles difference data generated by the de-duplication module 2414 and optionally other data, and packages the data into data packages for transport.

The sender module 2428 sends the data packages to the opposite data transport system (e.g., data transport system at the source side to the data transport system at the destination side). In some embodiments, the sender module 2428 includes an implementation of a data transport protocol (e.g., UDP-based Data Transfer Protocol) used for transporting the data packages.

Merge module 2430 performs the merge operations in order to reconstruct the files and file sets being sent from the source side from the files or file sets to be replaced and the difference data from the source side. The merge module 2430 also sends the reconstructed files or file sets to the file storage system in the destination side.

In some embodiments, views 2432 of files and of file sets, generated as part of the differential compression process, are stored in the data transport system 104/106.

Each of the above identified elements may be stored in one or more of the previously mentioned memory devices, and each of the modules or programs corresponds to a set of instructions for performing a function described above. The set of instructions can be executed by one or more processors (e.g., the CPUs 2402). The above identified modules or programs need not be implemented as separate software programs, procedures or modules, and thus various subsets of these modules may be combined or otherwise re-arranged in various embodiments. In some embodiments, memory 2406 may store a subset of the modules and data structures identified above. Furthermore, memory 2406 may store additional modules and data structures not described above.

Although FIG. 24 shows a file storage system, FIG. 24 is intended more as functional description of the various features which may be present in a file storage system than as a structural schematic of the embodiments described herein. In practice, and as recognized by those of ordinary skill in the art, items shown separately could be combined and some items could be separated. For example, some items (e.g., operating system 2410 and network communication module 2412 shown separately in FIG. 24 could be implemented on single servers and single items could be implemented by one or more servers. The actual number of servers and storage devices used to implement the data transport system 104/106 and how features are allocated among them will vary from one embodiment to another, and may depend in part on the amount of data traffic that the system must handle during peak usage periods as well as during average usage periods.

Figure 25A:
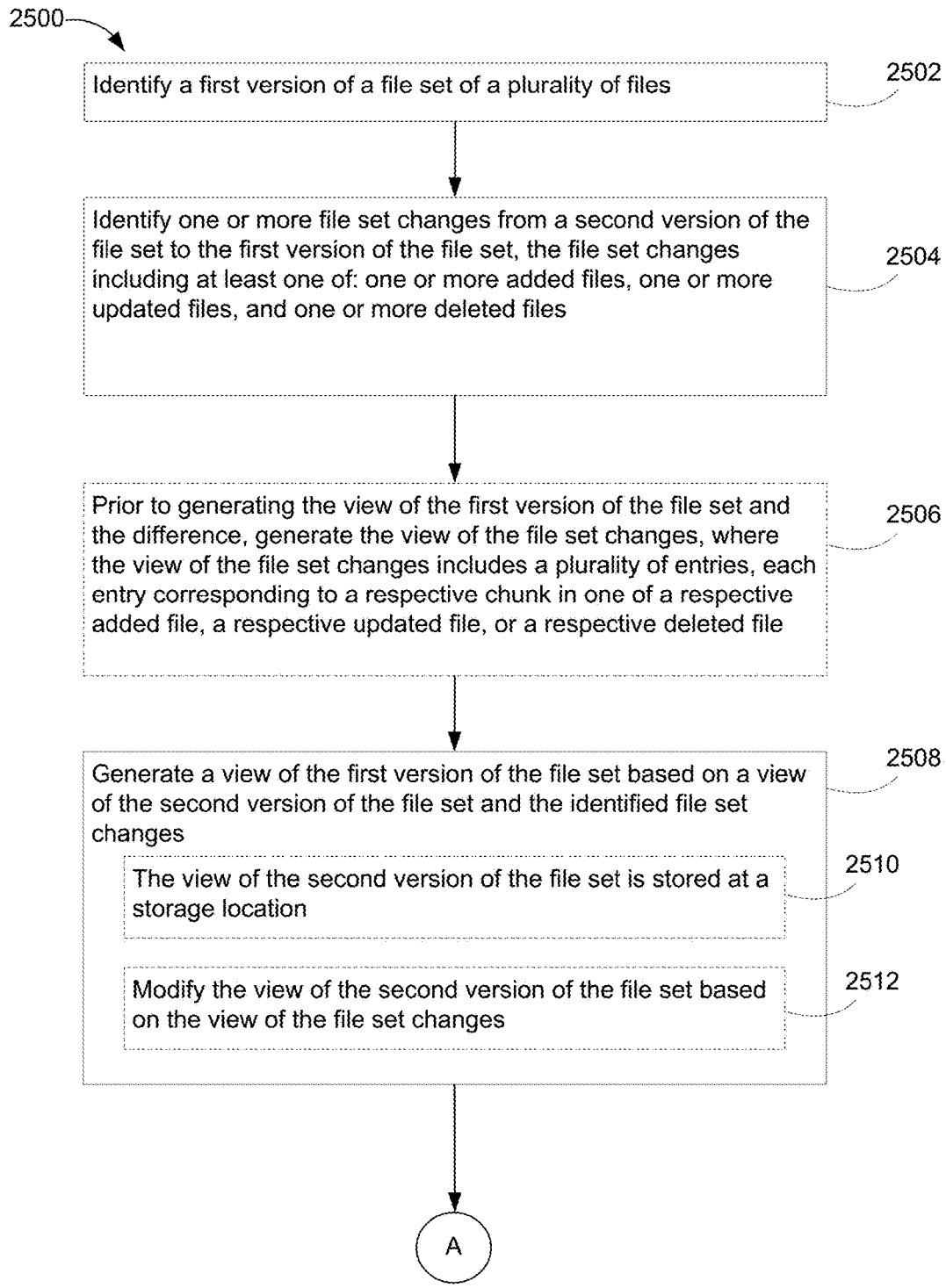
FIGS. 25A-25B illustrate an example method of transporting files in accordance with some embodiments.
Figure 25B:
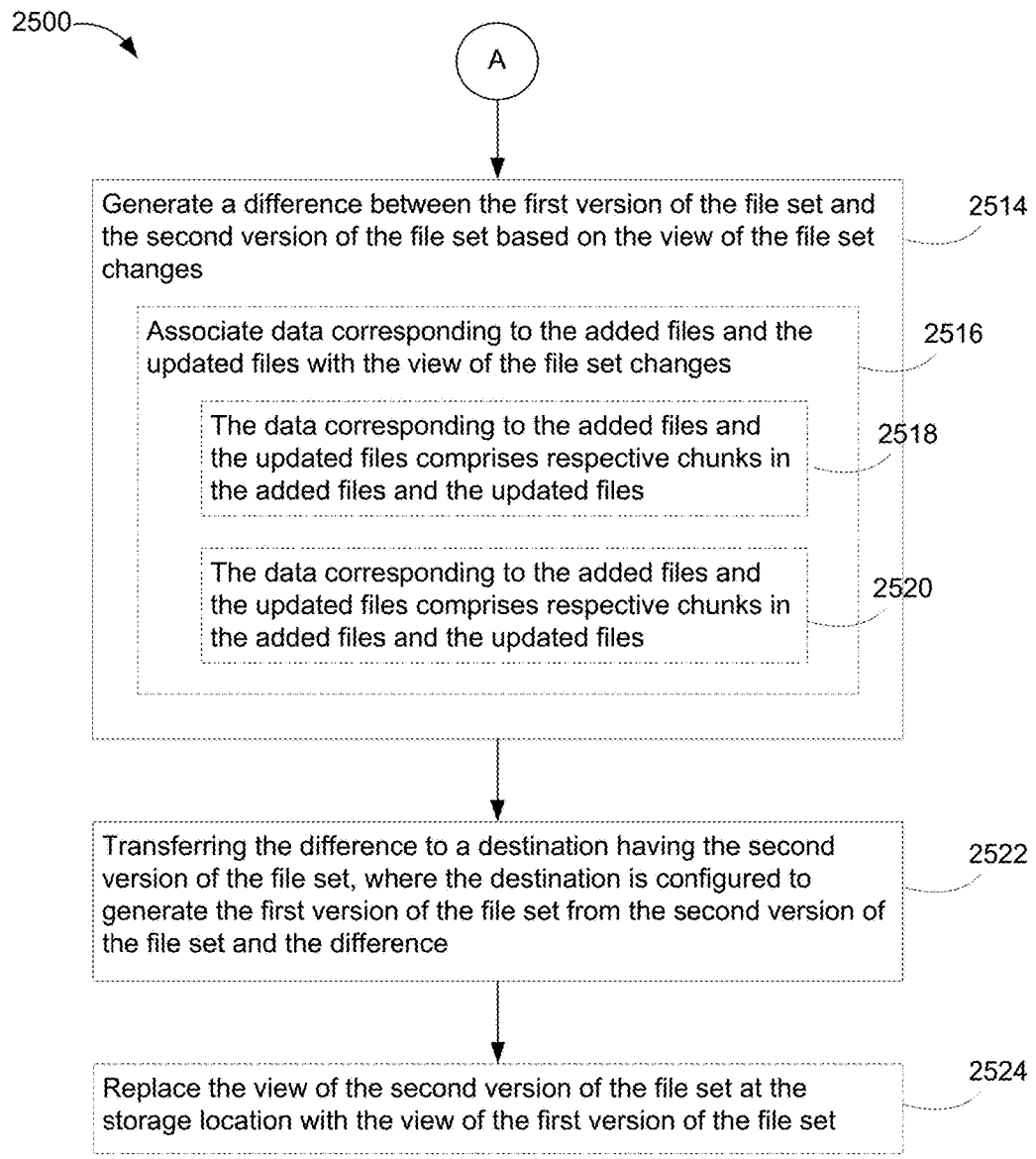

FIGS. 25A-25B illustrates an example method of transporting files in accordance with some embodiments. The method is performed at a computer system with memory and one or more processors (e.g., data transport system 104 and file storage system 102).

A first version of a file set of a plurality of files is identified (2502). For example, with reference to FIG. 9 above, the new version N of a file set is identified. The new version N is stored in the file storage system 102 and is retrieved from the file storage system 102 by the data transport system 104.

One or more file set changes from a second version of the file set to the first version of the file set are identified (2504). The file set changes include at least one of: one or more added files, one or more updated files, and one or more deleted files. The changes from an old version O of the file set to the new version N are identified. The changes <A, U, D> specify the files added (A), files updated (U), and files deleted (D) when O changed to N. In some embodiments, the data transport system 104 is notified of the changes <A, U, D> from O to N periodically or as the changes are made.

A view of the first version of the file set is generated based on a view of the second version of the file set and the identified file set changes (2508). A view V(N) of the new version N is generated based on a view V(O) of the old version O and a view V(A, U, D) of the file set changes <A, U, D>. In some embodiments, as described above with reference to FIG. 9, V(N) is generated by modifying V(O) based on V(A, U, D).

In some implementations, prior to generating the view of the first version of the file set and the difference, the view of the file set changes is generated, where the view of the file set changes include a plurality of entries, each entry corresponding to a respective chunk in one of a respective added file, a respective updated file, or a respective deleted file (2506). Before generating V(N) based on V(O) and V(A, U, D), V(A, U, D) is generated from <A, U, D>. V(A, U, D) includes data structures corresponding to Tables 2 and 3 described above. Table 3 includes entries for respective files in <A, U, D>, including identifiers of chunks for the respective files. Table 2 includes entries for chunks in the files included in Table 3. Thus, V(A, U, D) includes entries for respective chunks in added files, updated files, and/or deleted files.

In some embodiments, the view of the second version of the file set is stored at a storage location (2510). V(O) is stored in the file storage system 102 and/or the data transport system 104.

In some embodiments, generating a view of the first version of the file set based on a view of the second version of the file set and a view of the file set changes includes modifying the view of the second version of the file set based on the view of the file set changes (2512). As described above, V(N) is generated from V(O) and V(A, U, D). this generation includes modifying, within V(O) the data structures corresponding to Table 1 and Table 2 based on entries in V(A, U, D), such as adding entries corresponding to added files into V(O)::Table 1 and so on.

A difference between the first version of the file set and the second version of the file set is generated based on the view of the file set changes (2514). A difference Δ is generated from V(A, U, D) and Table 4, as described above. The difference Δ is a representation of the difference between O and N, in a view-based formatted as described above.

In some embodiments, generating a difference based on the view of the file set changes includes associating data corresponding to the added files and the updated files with the view of the file set changes (2516). In some embodiments, the data corresponding to the added files and the updated files includes respective chunks in the added files and the updated files (2518). In some embodiments, the data corresponding to the added files and the updated files are derived from the first version of the file set (2520). As described above, the difference Δ is generated based on V(A, U, D) and Table 4. Table 4 includes entries for chunks not already in O and V(O) (e.g., chunks from added files, updated chunks from updated files). Chunk data for the chunks not already in O and V(O) are copied from N into Table 4.

The difference is transferred to a destination having the second version of the file set, where the destination is configured to generate the first version of the file set from the second version of the file set and the difference (2522). The data transport system 104 transports the difference Δ (e.g., through network 110) to the data transport system 106 on the destination side. The data transport system 106 is configured to perform a merge operation on the difference Δ and O to reconstruct N, which is stored in the file storage system 108.

In some embodiments, the view of the second version of the file set is replaced at the storage location with the view of the first version of the file set (2524). Back at the source side, the generated V(N) replaces V(O) in wherever V(O) is stored; because N becomes the old version of the file set as N is changed (e.g., to N'), V(N) takes the place of V(O) as V(N') takes the place of V(N).

Figure 26:
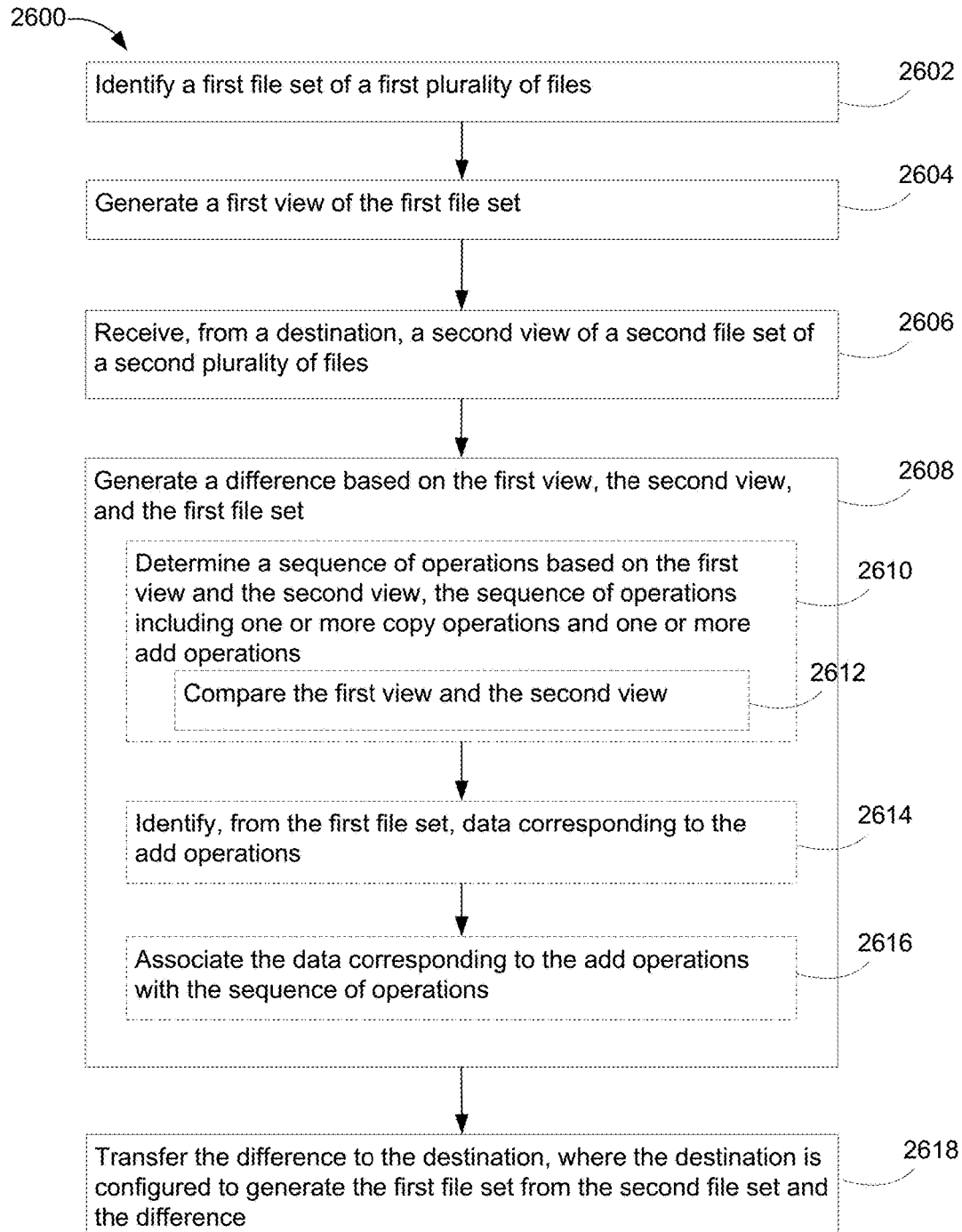
FIG. 26 illustrates an example method of transporting files in accordance with some embodiments.

FIG. 26 illustrates an example method of transporting files in accordance with some embodiments. The method is performed at a computer system with memory and one or more processors (e.g., data transport system 104 and file storage system 102).

A first file set of a first plurality of files is identified (2602). Referring to the description of FIGS. 11-13 above, at the source side, a file set T is identified. The data transport system 102 retrieves the file set T from the file storage system 102.

A first view of the first file set is generated (2604). A V(T) is generated at the source side (e.g., by the data transport system 104).

A second view of a second file set of a second plurality of files is received from a destination (2606). The source side (e.g., the data transport system 104) receives a V(R) of a file set R from the destination side, where R is stored (e.g., in the file storage system 108). The V(R) is generated by the destination side (e.g., the data transport system 106).

A difference is generated based on the first view, the second view, and the first file set (2608). The data transport system 102 generates a difference Δ based on V(T), V(R), and T. The difference Δ is a representation of the difference between T and R.

In some embodiments, generating a difference based on the first view, the second view, and the first file set includes determining a sequence of operations based on the first view and the second view, the sequence of operations including one or more copy operations and one or more add operations (2610), identifying, from the first file set, data corresponding to the add operations (2614), and associating the data corresponding to the add operations with the sequence of operations (2616). Generating the difference Δ includes determining a sequence of COPY and ADD operations based on V(T) and V(R), identifying data (e.g., chunks of files) in T and not in R (and thus are the data to be added by the ADD operations), and associating the data with the difference Δ. As described above, the data transport system 104 uses V(T) and V(R) to determine a sequence of COPY and ADD operations, and fills the data parameters in the ADD operations with chunk data from T. The result of these steps is the difference Δ.

In some embodiments, determining the sequence of operations includes comparing the first view and the second view (2612). The data transport system 102 compares V(T) and V(R) to determine which file chunks are common to both views and which file chunks are in V(T) but not in V(R). Based on this comparison, the sequence of COPY and ADD operations is determined.

The difference is transferred to the destination, where the destination is configured to generate the first file set from the second file set and the difference (2618). The data transport system 104 transports the difference Δ (e.g., through network 110) to the data transport system 106 on the destination side. The data transport system 106 is configured to perform a merge operation on the difference Δ and R to reconstruct T, which is stored in the file storage system 108.

Figure 27:
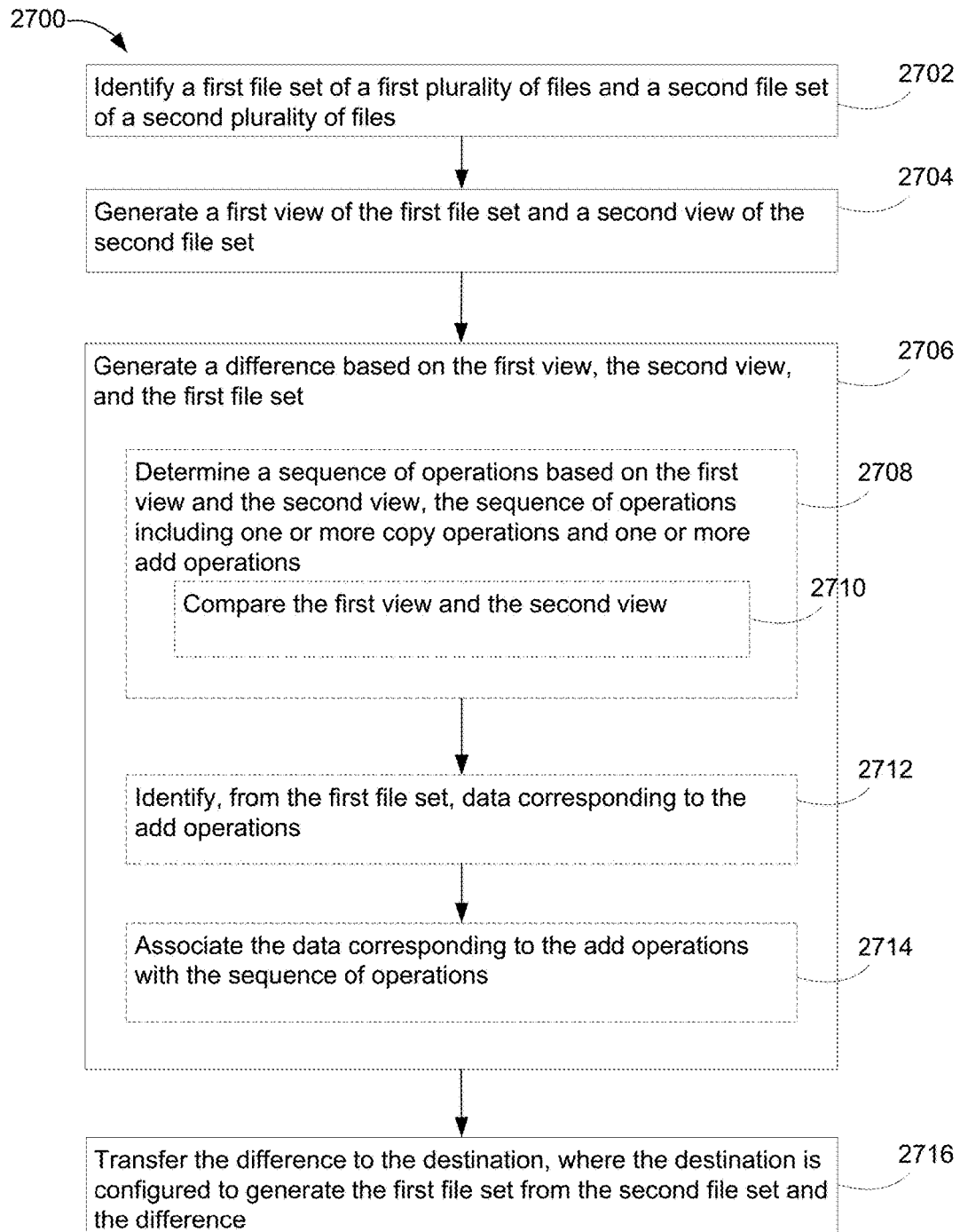
FIG. 27 illustrates an example method of transporting files in accordance with some embodiments.

FIG. 27 illustrates an example method of transporting files in accordance with some embodiments. The method is performed at a computer system with memory and one or more processors (e.g., data transport system 104 and file storage system 102).

A first file set of a first plurality of files and a second file set of a second plurality of files are identified (2702). Referring to the description of FIGS. 14-17 above, at the source side, file sets $S_1$ and $S_2$ are identified. The data transport system 102 retrieves the file sets $S_1$ and $S_2$ from the file storage system 102.

A first view of the first file set and a second view of the second file set are generated (2704). The data transport system 104 generates views $V(S_1)$ and $V(S_2)$.

A difference is generated based on the first view, the second view, and the first file set (2706). The data transport system 102 generates a difference Δ based on $V(S_2)$, $V(S_1)$, and $S_2$. The difference Δ is a representation of the difference between $S_1$ and $S_2$.

In some embodiments, generating a difference based on the first view, the second view, and the first file set includes determining a sequence of operations based on the first view and the second view, the sequence of operations including one or more copy operations and one or more add operations (2708), identifying, from the first file set, data corresponding to the add operations (2712), and associating the data corresponding to the add operations with the sequence of operations (2714). Generating the difference Δ includes determining a sequence of COPY and ADD operations based on $V(S_2)$ and $V(S_1)$, identifying data (e.g., chunks of files) in $S_2$ and not in $S_1$ (and thus are the data to be added by the ADD operations), and associating the data with the difference Δ. The data transport system 104 uses $V(S_2)$ and $V(S_1)$ to determine a sequence of COPY and ADD operations, and fills the data parameters in the ADD operations with chunk data from $S_2$, similar to the procedure for determining the difference in FIGS. 11-13. The result of these steps is the difference Δ.

In some embodiments, determining the sequence of operations includes comparing the first view and the second view (2710). The data transport system 102 compares $V(S_2)$ and $V(S_1)$ to determine which file chunks are common to both views and which file chunks are in $V(S_2)$ but not in $V(S_1)$. Based on this comparison, the sequence of COPY and ADD operations is determined.

The difference is transferred to the destination, where the destination is configured to generate the first file set from the second file set and the difference (2618). The data transport system 104 transports the difference Δ (e.g., through network 110) to the data transport system 106 on the destination side. The data transport system 106 is configured to perform a merge operation on the difference Δ and $S_1$ to reconstruct $S_2$, which is stored in the file storage system 108.

Figure 28A:
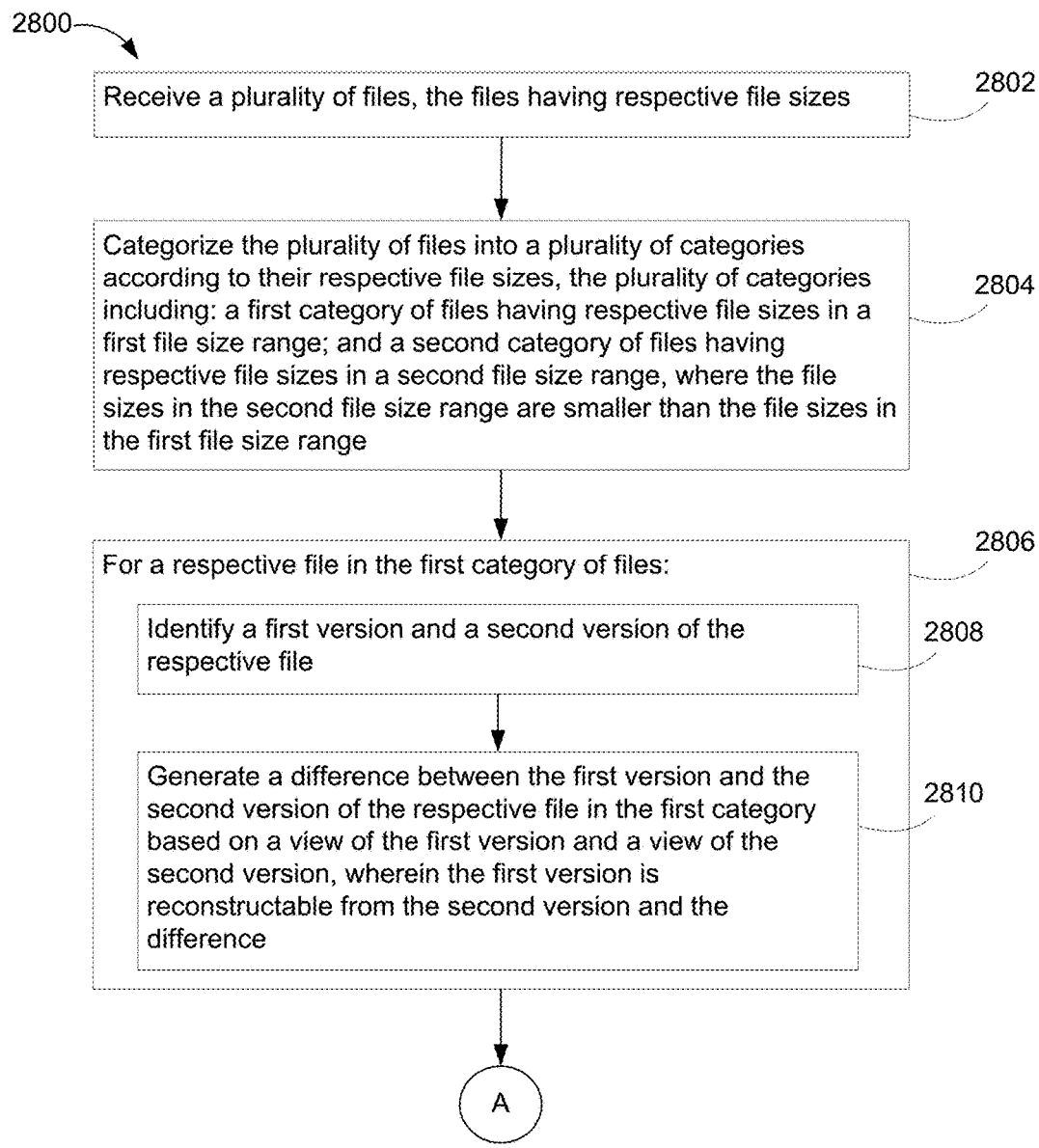
FIGS. 28A-28C illustrate an example method of transporting files in accordance with some embodiments.
Figure 28B:
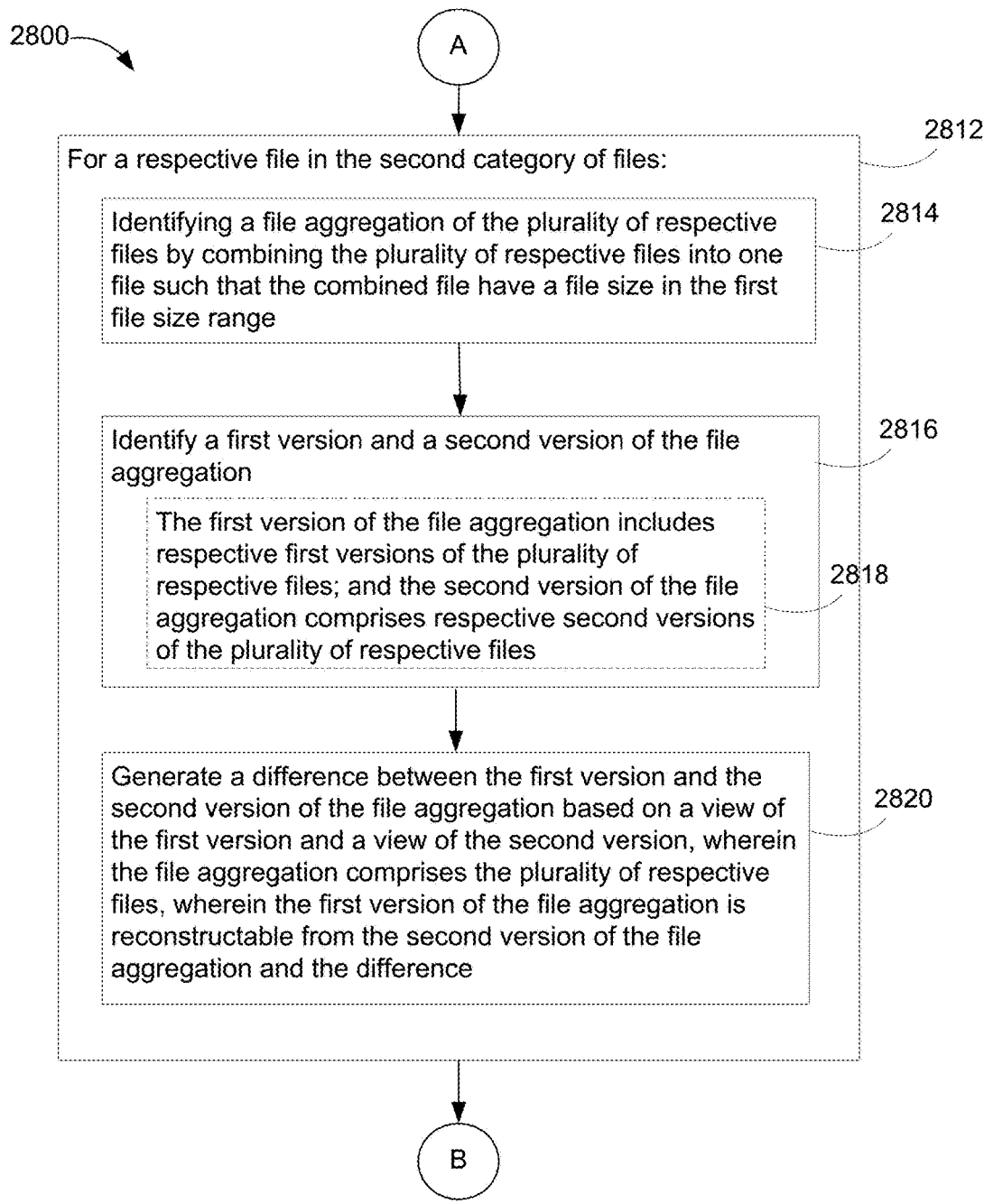
Figure 28C:
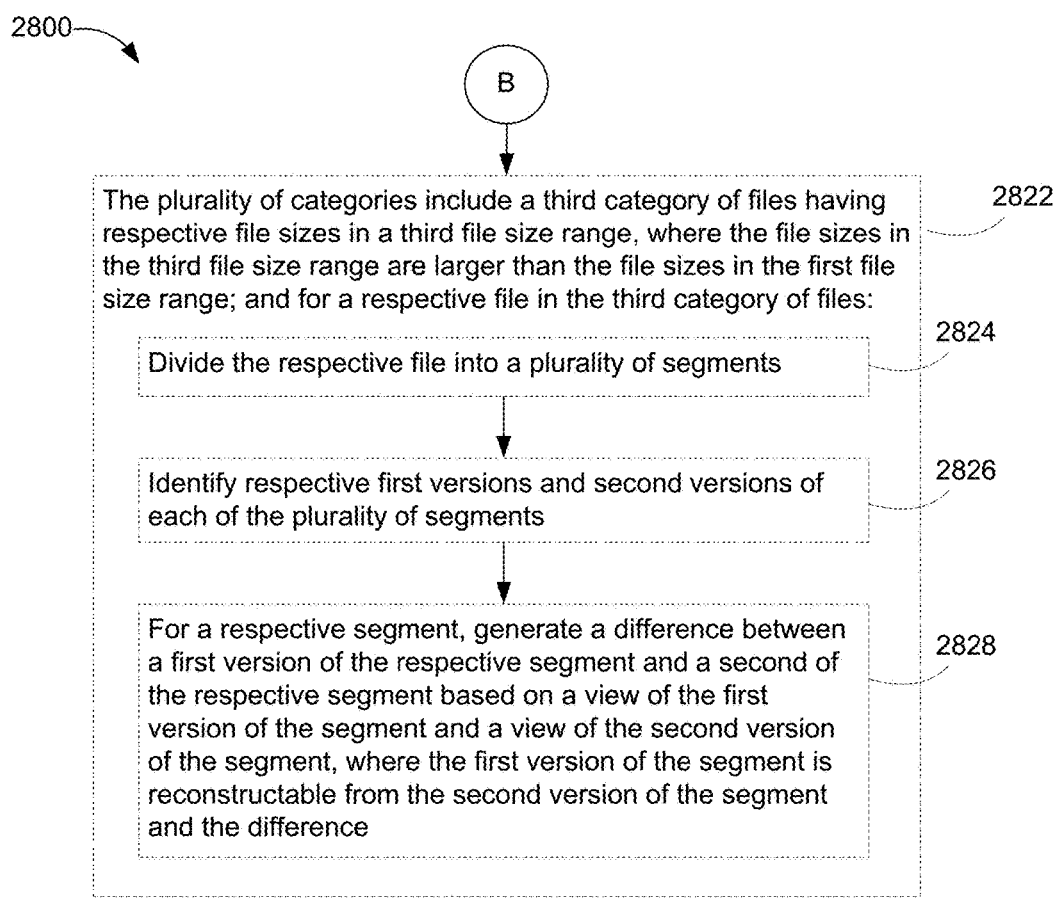

FIGS. 28A-28C illustrate an example method of transporting files in accordance with some embodiments. The method is performed at a computer system with memory and one or more processors (e.g., data transport system 104 and file storage system 102).

A plurality of files is received (2802). The files have respective file sizes ranging from "tiny" (e.g., smaller than 4 KB) to "large" (e.g., 2 GB or larger). The files are stored at the file storage system 102. The files are received by the data transport system 104. The files may be sent to the data transport system 104 as archival streams.

The plurality of files is categorized into a plurality of categories according to their respective file sizes (2804). The plurality of categories include a first category of files having respective file sizes in a first file size range, and a second category of files having respective file sizes in a second file size range, wherein the file sizes in the second file size range are smaller than the file sizes in the first file size range. The data transport system 104 (e.g., the file categorization module 2424) categorizes the files by size. In some embodiments, there are a "tiny files" category, a "small files" category, a "normal files" category, and a "large files" category. The "normal files" category corresponds to a file size range (e.g., 512 KB-2 GB), and the "small files" category corresponds to a file size range of smaller file sizes than the "normal files" category (e.g., 4 KB-512 KB). As shown in FIG. 19, files are processed differently based on the file size category.

For a respective file in the first category of files (2806), a first version and a second version of the respective file are identified (2808), and a difference between the first version and the second version of the respective file in the first category is generated based on a view of the first version and a view of the second version, where the first version is reconstructable from the second version and the difference (2810). For example, for a file in the "normal files" category, the differential compression techniques described above are applied to the file: a difference between a first version and a second version of the file (e.g., a new version N and an old version O of the file) is determined based on views of the first and second versions (e.g., V(N) and V(O)). The difference is determined such that N is reconstructable from O and the difference (e.g., by a merge operation N=O+difference) The difference is transported to the data transport system 106 on the destination size, where the merge operation is performed to reconstruct N. Similarly, the differential compression techniques described above are applied to the file sets of "normal" files.

For a plurality of respective files in the second category of files (2812): a file aggregation of the plurality of respective files is identified by combining the plurality of respective files into one file such that the combined file have a file size in the first file size range (2814), a first version and a second version of the file aggregation are identified (2816), and a difference between the first version and the second version of the file aggregation is generated based on a view of the first version and a view of the second version, where the file aggregation includes the plurality of respective files, wherein the first version of the file aggregation is reconstructable from the second version of the file aggregation and the difference (2820). Files in the "small files" category are annexed into a larger file group or aggregation (e.g., into one file). The size of the file group or aggregation is that of one of the other categories corresponding to larger file sizes (e.g., a size in the "normal files" range). A first version (e.g., a new version) and a second version (e.g., an old version) of the file aggregation are identified, and views are generated for the first and second versions. A difference between the first version and the second version is generated based on the views, such that the first version can be reconstructed from a merge operation on the second version and the difference. Thus, the file group/aggregation is treated as if it is a file in the "normal files" category. In some embodiments, the differential compression techniques described above are applied to file sets that contain file aggregations, as if the file sets contain "normal" files.

In some embodiments, the first version of the file aggregation includes respective first versions of the plurality of respective files, and the second version of the file aggregation includes respective second versions of the plurality of respective files (2818). The first version of the file aggregation includes respective first versions (e.g., respective new versions) of the individual files in the file aggregation, and the second version of the file aggregation includes respective second versions (e.g., respective old versions) of the individual files in the file aggregation.

In some embodiments, the plurality of categories include a third category of files having respective file sizes in a third file size range, where the file sizes in the third file size range are larger than the file sizes in the first file size range (2822). For a respective file in the third category of files, the respective file is divided into a plurality of segments (2824), each file segment having a file size in the first file size range, respective first versions and second versions of each of the plurality of segments are identified (2826), and for a respective segment, a difference between a first version of the respective segment and a second of the respective segment is generated based on a view of the first version of the segment and a view of the second version of the segment, where the first version of the segment is reconstructable from the second version of the segment and the difference (2828). For example, a file in the "large files" category is divided into segments. In some embodiments, the segment for a file each has a size that is in the "normal files" category, except for perhaps the last segment. For each segment, a first version and a second version are identified. In some embodiments, each respective segment is identified in a first version of the file and a second version of the file. For a respective segment, say, a Segment A, Segment A in the first version of the file is the first version of Segment A, and Segment A in the second version of the file is the second version of Segment A. Respective views are generated for the first version and the second version of Segment A. A difference between the first version and the second version is generated based on the views, such that the first version of Segment A can be reconstructed from a merge operation on the second version of Segment A and the difference. Thus, each segment is treated as if it is a file in the "normal files" category. In some embodiments, the differential compression techniques described above are applied to file sets that contain the segments, as if the file sets contain "normal" files.

As described above, files in the "small files" category are grouped into aggregations that are treated as files in the "normal files" category, and segments of files in the "large files" category are treated as files in the "normal files" category. In some embodiments, the categorization of files according to file size, grouping of "small" files, and segmenting of "large" files are transparent to the module(s) applying the differential compression techniques (e.g., dedupe engine 1904, de-duplication module 2414). From the perspective of these modules, whatever data is received as inputs for the differential compression, whether they are "normal" files, aggregations of "small" files, or segments of "large" files, the modules treat them all as "normal" files and are unaware of the categorization. Similarly, the modules treat file sets containing "normal" files, file sets containing aggregations of "small" files, and file sets containing segments of "large" files all as file sets of "normal" files without being aware of the categorization.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter represented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not represent an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a computer system having one or more processors and memory storing programs executed by the one or more processors,
receiving a plurality of files, the files having respective file sizes;
categorizing the plurality of files into a plurality of categories according to their respective file sizes, the plurality of categories comprising:
a first category of files having respective file sizes in a first file size range; and
a second category of files having respective file sizes in a second file size range, wherein the file sizes in the second file size range are smaller than the file sizes in the first file size range;
for a respective file in the first category of files:
identifying a first version and a second version of the respective file; and
generating a difference between the first version and the second version of the respective file in the first category based on a view of the first version and a view of the second version, wherein the first version is reconstructable from the second version and the difference; and
for a plurality of respective files in the second category of files:
identifying a file aggregation of the plurality of respective files by combining the plurality of respective files into one file such that the combined file have a file size in the first file size range;
identifying a first version and a second version of the file aggregation; and
generating a difference between the first version and the second version of the file aggregation based on a view of the first version and a view of the second version, wherein the file aggregation comprises the plurality of respective files, wherein the first version of the file aggregation is reconstructable from the second version of the file aggregation and the difference.

2. The method of claim 1, wherein:
the first version of the file aggregation comprises respective first versions of the plurality of respective files; and
the second version of the file aggregation comprises respective second versions of the plurality of respective files.

3. The method of claim 1, wherein the plurality of categories comprise a third category of files having respective file sizes in a third file size range, wherein the file sizes in the third file size range are larger than the file sizes in the first file size range, the method further comprising:
for a respective file in the third category of files: dividing the respective file into a plurality of segments; identifying respective first versions and second versions of each of the plurality of segments; and
for a respective segment, generating a difference between a first version of the respective segment and a second of the respective segment based on a view of the first version of the segment and a view of the second version of the segment, wherein the first version of the segment is reconstructable from the second version of the segment and the difference.

4. The method of claim 1, further comprising:
transferring the difference between the first version and the second version of the respective file in the first category to a destination having the second version of the respective file in the first category, wherein the destination is configured to generate the first version of the respective file in the first category from the second version of the respective file in the first category and the difference.

5. The method of claim 1, further comprising:
transferring the difference between the first version and the second version of the file aggregation to a destination having the second version of the file aggregation, wherein the destination is configured to generate the first version of the file aggregation from the second version of the file aggregation and the difference.

6. The method of claim 1, wherein the plurality of categories further comprise a third category of files having respective file sizes in a third file size range, where the file sizes in the third file size range are larger than the file sizes in the first file size range, the method further comprising:
for a respective file in the third category of files:
dividing the respective file into a plurality of file segments, each file segment having a file size in the first file size range;
identifying a first version and a second version of each file segment; and
generating a difference between the first version and the second version of each segment based on a view of the first version and a view of the second version, wherein the first version is reconstructable from the second version and the difference.

7. A computer system, comprising:
one or more processors;
memory; and
a plurality of program modules stored in the memory and executed by the one or more processors, the program modules further comprising instructions configured to cause the one or more processors to perform the steps of:
receiving a plurality of files, the files having respective file sizes;
categorizing the plurality of files into a plurality of categories according to their respective file sizes, the plurality of categories comprising:
a first category of files having respective file sizes in a first file size range; and
a second category of files having respective file sizes in a second file size range, wherein the file sizes in the second file size range are smaller than the file sizes in the first file size range;
for a respective file in the first category of files:
identifying a first version and a second version of the respective file; and
generating a difference between the first version and the second version of the respective file in the first category based on a view of the first version and a view of the second version, wherein the first version is reconstructable from the second version and the difference; and
for a plurality of respective files in the second category of files:
identifying a file aggregation of the plurality of respective files by combining the plurality of respective files into one file such that the combined file have a file size in the first file size range;
identifying a first version and a second version of the file aggregation; and
generating a difference between the first version and the second version of the file aggregation based on a view of the first version and a view of the second version, wherein the file aggregation comprises the plurality of respective files, wherein the first version of the file aggregation is reconstructable from the second version of the file aggregation and the difference.

8. The computer system of claim 7, wherein:
the first version of the file aggregation comprises respective first versions of the plurality of respective files; and
the second version of the file aggregation comprises respective second versions of the plurality of respective files.

9. The computer system of claim 7, wherein the plurality of categories comprise a third category of files having respective file sizes in a third file size range, wherein the file sizes in the third file size range are larger than the file sizes in the first file size range, and the program modules further comprise instructions configured to cause the one or more processors to perform the steps of:
for a respective file in the third category of files:
dividing the respective file into a plurality of segments;
identifying respective first versions and second versions of each of the plurality of segments; and
for a respective segment, generating a difference between a first version of the respective segment and a second of the respective segment based on a view of the first version of the segment and a view of the second version of the segment, wherein the first version of the segment is reconstructable from the second version of the segment and the difference.

10. The computer system of claim 7, wherein the program modules further comprise instructions configured to cause the one or more processors to perform the step of:
transferring the difference between the first version and the second version of the respective file in the first category to a destination having the second version of the respective file in the first category, wherein the destination is configured to generate the first version of the respective file in the first category from the second version of the respective file in the first category and the difference.

11. The computer system of claim 7, wherein the program modules further comprise instructions configured to cause the one or more processors to perform the step of:
transferring the difference between the first version and the second version of the file aggregation to a destination having the second version of the file aggregation, wherein the destination is configured to generate the first version of the file aggregation from the second version of the file aggregation and the difference.

12. The computer system of claim 7, wherein the plurality of categories further comprise a third category of files having respective file sizes in a third file size range, where the file sizes in the third file size range are larger than the file sizes in the first file size range, wherein the program modules further comprise instructions configured to cause the one or more processors to perform the steps of:
for a respective file in the third category of files:
dividing the respective file into a plurality of file segments, each file segment having a file size in the first file size range;
identifying a first version and a second version of each file segment; and
generating a difference between the first version and the second version of each segment based on a view of the first version and a view of the second version, wherein the first version is reconstructable from the second version and the difference.

13. A non-transitory computer readable storage medium, storing one or more program modules for execution by one or more processors of a computer system, the one or more program modules further comprising instructions configured to cause the one or more processors to perform the steps of:
receiving a plurality of files, the files having respective file sizes;
categorizing the plurality of files into a plurality of categories according to their respective file sizes, the plurality of categories comprising:

a first category of files having respective file sizes in a first file size range; and a second category of files having respective file sizes in a second file size range, wherein the file sizes in the second file size range are smaller than the file sizes in the first file size range;

for a respective file in the first category of files:

identifying a first version and a second version of the respective file; and generating a difference between the first version and the second version of the respective file in the first category based on a view of the first version and a view of the second version, wherein the first version is reconstructable from the second version and the difference; and for a plurality of respective files in the second category of files:

identifying a file aggregation of the plurality of respective files by combining the plurality of respective files into one file such that the combined file have a file size in the first file size range;

identifying a first version and a second version of the file aggregation; and generating a difference between the first version and the second version of the file aggregation based on a view of the first version and a view of the second version, wherein the file aggregation comprises the plurality of respective files, wherein the first version of the file aggregation is reconstructable from the second version of the file aggregation and the difference.

14. The non-transitory computer readable storage medium of claim 13, wherein:

the first version of the file aggregation comprises respective first versions of the plurality of respective files; and the second version of the file aggregation comprises respective second versions of the plurality of respective files.

15. The non-transitory computer readable storage medium of claim 13, wherein the plurality of categories comprise a third category of files having respective file sizes in a third file size range, wherein the file sizes in the third file size range are larger than the file sizes in the first file size range, and the one or more program modules further comprise instructions configured to cause the one or more processors to perform the steps of:

for a respective file in the third category of files:

dividing the respective file into a plurality of segments;

identifying respective first versions and second versions of each of the plurality of segments; and for a respective segment, generating a difference between a first version of the respective segment and a second of the respective segment based on a view of the first version of the segment and a view of the second version of the segment, wherein the first version of the segment is reconstructable from the second version of the segment and the difference.

16. The non-transitory computer readable storage medium of claim 13, wherein the one or more program modules further comprise instructions configured to cause the one or more processors to perform the step of:

transferring the difference between the first version and the second version of the respective file in the first category to a destination having the second version of the respective file in the first category, wherein the destination is configured to generate the first version of the respective file in the first category from the second version of the respective file in the first category and the difference.

17. The non-transitory computer readable storage medium of claim 13, wherein the one or more program modules further comprise instructions configured to cause the one or more processors to perform the step of:

transferring the difference between the first version and the second version of the file aggregation to a destination having the second version of the file aggregation, wherein the destination is configured to generate the first version of the file aggregation from the second version of the file aggregation and the difference.

18. The non-transitory computer readable storage medium of claim 13, wherein the plurality of categories further comprise a third category of files having respective file sizes in a third file size range, where the file sizes in the third file size range are larger than the file sizes in the first file size range, wherein the program modules further comprise instructions configured to cause the one or more processors to perform the steps of:

for a respective file in the third category of files: dividing the respective file into a plurality of file segments, each file segment having a file size in the first file size range; identifying a first version and a second version of each file segment; and generating a difference between the first version and the second version of each segment based on a view of the first version and a view of the second version, wherein the first version is reconstructable from the second version and the difference.

* * * * *